(12) United States Patent
Sharma et al.

(10) Patent No.: US 11,321,606 B2
(45) Date of Patent: May 3, 2022

(54) SYSTEMS, APPARATUS, METHODS, AND ARCHITECTURES FOR A NEURAL NETWORK WORKFLOW TO GENERATE A HARDWARE ACCELERATOR

(71) Applicant: Bigstream Solutions, Inc., Mountain View, CA (US)

(72) Inventors: Hardik Sharma, Mountain View, CA (US); Jongse Park, Mountain View, CA (US)

(73) Assignee: BIGSTREAM SOLUTIONS, INC., Mountain View, CA (US)

(*) Notice: Subject to any disclaimer, the term of this patent is extended or adjusted under 35 U.S.C. 154(b) by 283 days.

(21) Appl. No.: 16/744,040

(22) Filed: Jan. 15, 2020

(65) Prior Publication Data

US 2020/0225996 A1    Jul. 16, 2020

Related U.S. Application Data

(60) Provisional application No. 62/792,785, filed on Jan. 15, 2019.

(51) Int. Cl.

| | |
|---|---|
| *G06F 15/78* | (2006.01) |
| *G06F 15/80* | (2006.01) |
| *G06N 3/04* | (2006.01) |
| *G06N 3/10* | (2006.01) |
| *G06N 3/08* | (2006.01) |
| *G06F 5/06* | (2006.01) |
| *G06N 20/00* | (2019.01) |
| *G06F 9/48* | (2006.01) |

(Continued)

(52) U.S. Cl.
CPC ............. *G06N 3/04* (2013.01); *G06F 5/06* (2013.01); *G06F 9/4881* (2013.01);
(Continued)

(58) Field of Classification Search
CPC ............. G06F 9/5061; G06F 15/7889; G06F 15/8046; G06N 3/08
See application file for complete search history.

(56) References Cited

U.S. PATENT DOCUMENTS

| | | |
|---|---|---|
| 8,706,790 B1 | 4/2014 | Langhammer |
| 10,635,740 B2 | 4/2020 | Phelps et al. |

(Continued)

OTHER PUBLICATIONS

Office Action from U.S. Appl. No. 16/744,037, dated Aug. 4, 2020, 26 pages.

(Continued)

*Primary Examiner* — Jacob Petranek
(74) *Attorney, Agent, or Firm* — Jaffery Watson Mendonsa & Hamilton LLP

(57) ABSTRACT

Methods, systems, apparatus, and circuits for dynamically optimizing the circuit for forward and backward propagation phases of training for neural networks, given a fixed resource budget. The circuits comprising: (1) a specialized circuit that can operate on a plurality of multi-dimensional inputs and weights for the forward propagations phase of neural networks; and (2) a specialized circuit that can operate on either gradients and inputs, or gradients and weights for the backward propagation phase of neural networks. The method comprising: (1) an analysis step to obtain the number of operations and the precision of operations in the forward and backward propagations phases of the neural network; (2) a sampling step to obtain the number of zero-valued activations and gradients during the execution of the neural network; (3) a scheduling and estimation step to obtain the runtime for the forward and backward phases of neural network execution using specialized circuits; (4) a builder step to apply the optimal breakdown of resource budget for the forward and backward phases of the neural network to improve the execution of the Neural Network training for future iterations.

13 Claims, 19 Drawing Sheets

(51) Int. Cl.
*G06F 9/50* (2006.01)
*G06N 5/04* (2006.01)

(52) U.S. Cl.
CPC .......... *G06F 9/5027* (2013.01); *G06F 9/5061* (2013.01); *G06F 15/7889* (2013.01); *G06N 3/08* (2013.01); *G06N 3/084* (2013.01); *G06N 3/10* (2013.01); *G06N 5/046* (2013.01); *G06N 20/00* (2019.01)

(56) References Cited

U.S. PATENT DOCUMENTS

| | | |
|---|---|---|
| 10,678,509 B1 | 6/2020 | Settle et al. |
| 2018/0143860 A1* | 5/2018 | Dasu .................. G06F 15/7867 |
| 2018/0247190 A1* | 8/2018 | Chung .................... G06N 3/08 |
| 2019/0171420 A1 | 6/2019 | Malaya |
| 2020/0097442 A1 | 3/2020 | Yaakov |
| 2020/0193273 A1* | 6/2020 | Chung .................. G06N 3/063 |
| 2020/0193274 A1* | 6/2020 | Darvish Rouhani .. G06N 3/063 |
| 2021/0365791 A1* | 11/2021 | Mishali ............... G06F 15/7871 |

OTHER PUBLICATIONS

Final Office Action, U.S. Appl. No. 16/744,037, Mar. 2, 2021, 32 pages, USPTO.
Hadrik Sharma et al., "Bit Fusion: Bit-Level Dynamically Composable Architecture for Accelerating Deep Neural Networks," 2018, pp. 764-775, IEEE.

* cited by examiner

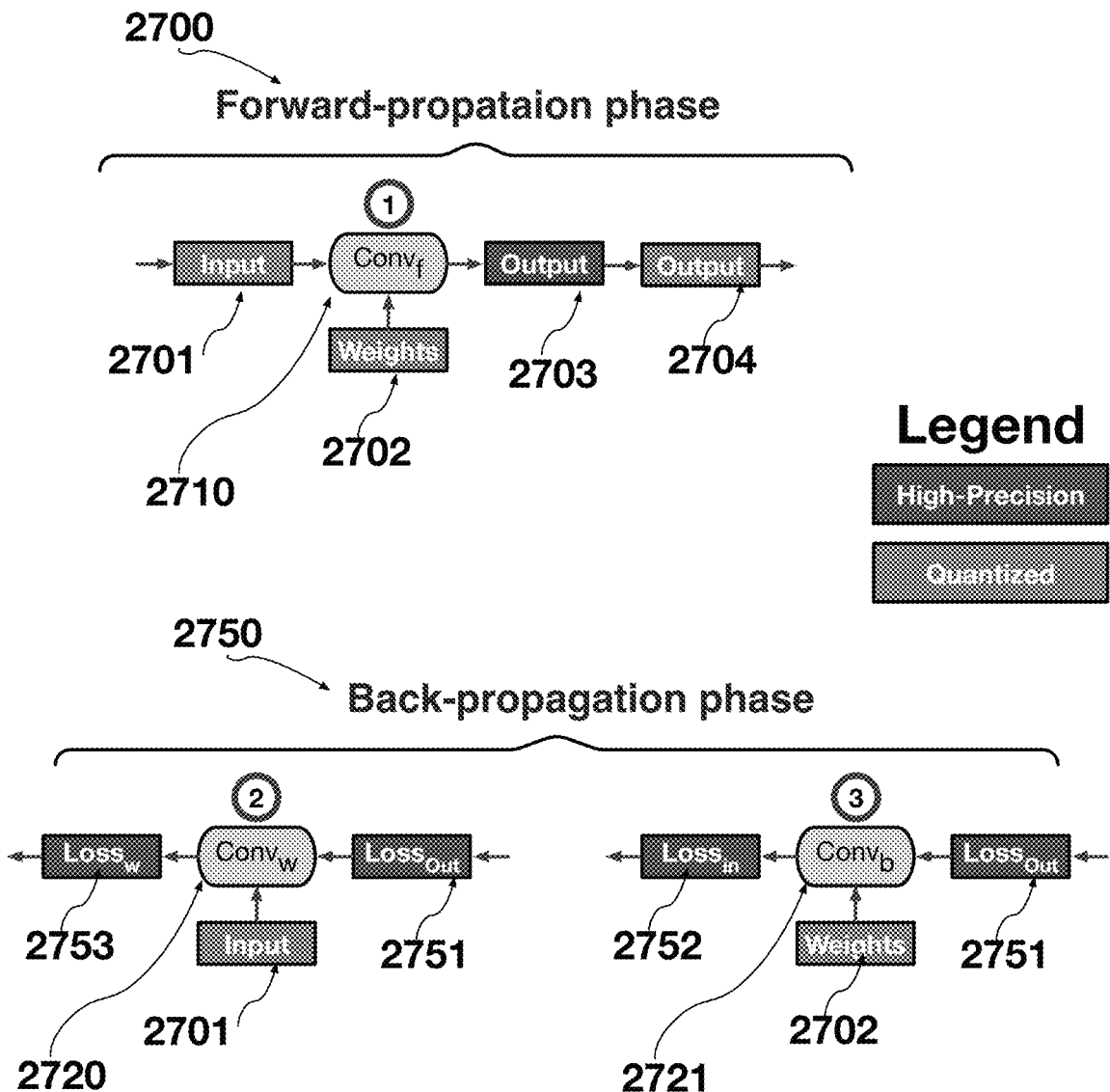
FIG. 16 Operations for quantized neural network training for a single convolution layer when using specialized circuits described in this specification.

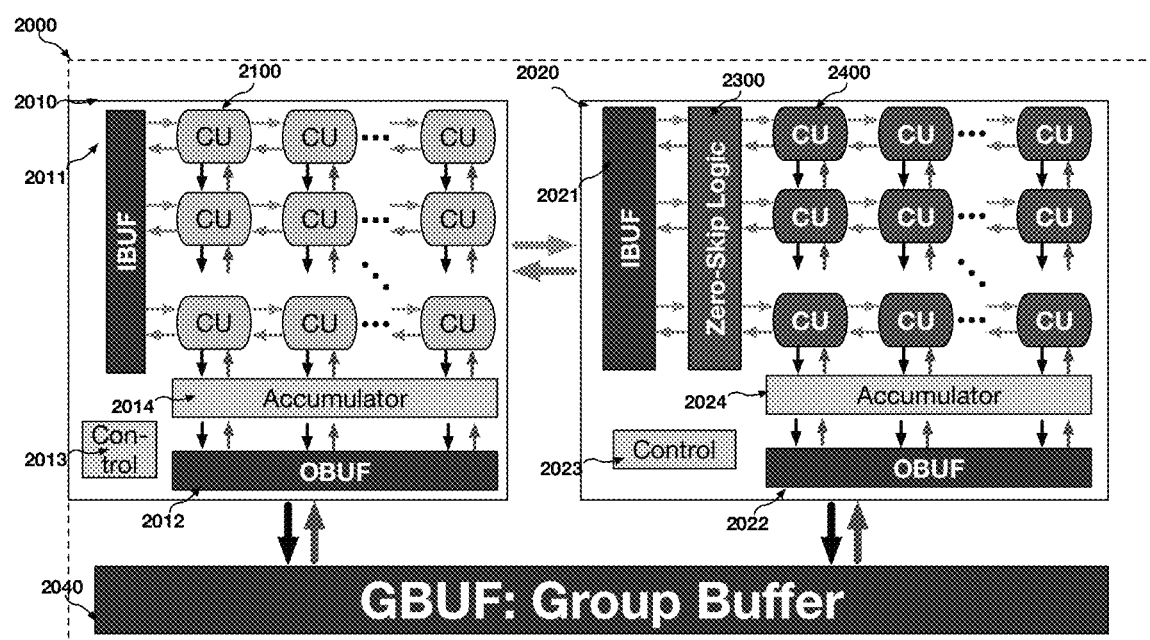
FIG. 17 Proposed architecture for training quantized neural networks.

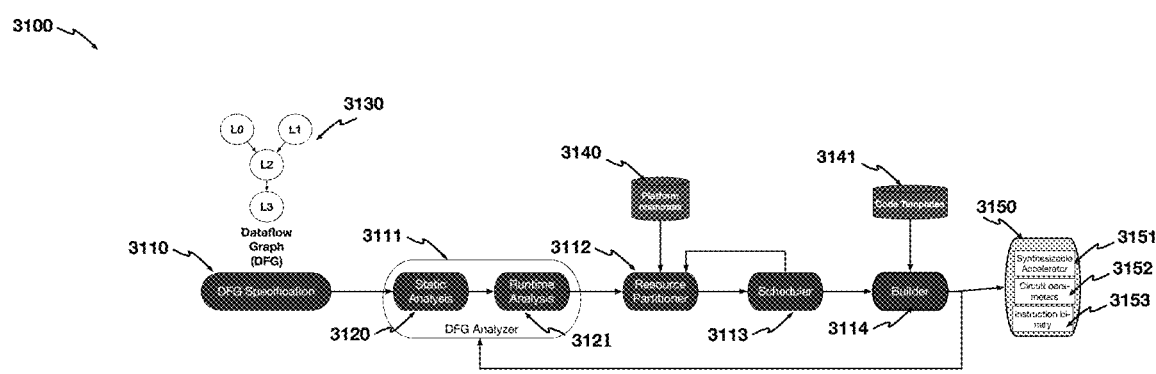
FIG. 18 Overview of automated optimization method described in this specification.

Inputs : $D$: DFG of the quantized DNN
  $resource_{total}$: FPGA's total resources
Output : $p$: Optimal breakdown of resources for Q-array 2010
  $schedule$: Schedule of operations for the optimized $p$
arg min: $cycles_{total}$: The total execution cycles for one training iteration

Function AnalyzeDFG$(D)$
  // Static Analysis
  // Number of operations in forward/backward
    $ops_{fwd}, ops_{bwd} \leftarrow D$
  // Tuple of precision per layer
    $precision_{fwd}$   $ops_{fwd}$
    $precision_{bwd}$   $ops_{bwd}$
  // LUT/DSP resources for forward operations
    $resource_{fwd}$   $precision_{fwd}$
    $resource_{bwd}$   $precision_{bwd}$
  // Runtime Analysis
    $nz_{fwd}, nz_{bwd}$   Execute$(D)$
  // Obtain $c$ and $r$
    $c \quad \frac{op_{bwd} \times nz_{bwd}}{op_{fwd} \times nz_{fwd}}$
    $r \quad \frac{resource_{bwd}}{resource_{fwd}} - 1$
  return $c, r$
end

Function Partition$(c, r)$
  return $p = -\frac{c+1}{c \times r - 1} + \sqrt{\frac{(c+1)^2}{(c \times r - 1)^2} - \frac{c-r}{r \times (c \times r - 1)}}$
end

Function Schedule$(D, p)$
  // Schedule and estimate cycles for forward/backward phase
    $cycles_{fwd}, cycles_{bwd} \leftarrow$ Model$(D, p)$
  return $cycles_{fwd}, cycles_{bwd}$
end

Initialize $c, r \leftarrow$ AnalyzeDFG$(D)$
$cycles_{fwd}, cycles_{bwd} \leftarrow$ Schedule$(D, p)$
$c_{next} \quad \frac{cycles_{bwd}}{cycles_{fwd}}$
// Refine the partitioning Initialize $c_{next} \quad -\infty$
Do
  $p \leftarrow$ Partition$(c, r)$
  $cycles_{fwd}, cycles_{bwd} \leftarrow$ Schedule$(D, p)$
  $c_{next} \quad \frac{cycles_{bwd}}{cycles_{fwd}}$
while $|c - c_{next}| > \epsilon$;

FIG. 19: Heterogeneous Resource Partitioning.

SYSTEMS, APPARATUS, METHODS, AND ARCHITECTURES FOR A NEURAL NETWORK WORKFLOW TO GENERATE A HARDWARE ACCELERATOR

RELATED APPLICATIONS

This application claims the benefit of U.S. Provisional Application No. 62/792,785, filed on Jan. 15, 2019, the entire contents of this Provisional application is hereby incorporated by reference.

TECHNICAL FIELD

Embodiments described herein generally relate to the fields of data processing and machine learning, and more particularly relates to a hardware accelerator having a heterogenous architecture for training quantized neural networks.

BACKGROUND

While interest in Deep Neural Networks (DNNs) continues to grow for big data applications, the focus of recent literature has shifted towards exploring efficient ways of training and executing deep learning models. One prominent approach for improving efficiency is quantization, which reduces the bit widths for data and operations in a deep learning model to yield increased performance and/or energy efficiency. From the architecture community, several prior approaches have exploited quantization to improve the efficiency of the inference phase of deep learning. In order to maximize the benefits from quantization and retain classification accuracy, the quantized version of the DNNs needs to be retrained which can take weeks on GPUs, depending on the size of the DNN model.

SUMMARY

For one embodiment of the present invention, a hardware accelerator with a heterogenous architecture for training quantized neural networks is described. In one example, a data processing system to perform a workflow for generating a hardware accelerator, comprises memory; and a processor coupled to the memory. The processor is configured to perform a dataflow analysis operation to analyze resource requirements for a dataflow graph of a neural network (NN) model, to perform a resource partitioning operation to analytically split resources of a hardware accelerator, to perform a cycle-accurate scheduling operation to obtain cycle counts for forward and backward passes of the dataflow graph, and to generate a synthesizable hardware accelerator using an optimal resource breakdown.

Other features and advantages of embodiments of the present invention will be apparent from the accompanying drawings and from the detailed description that follows below.

BRIEF DESCRIPTION OF THE DRAWINGS

FIG. 16 illustrates the operations in neural network training.

FIG. 17 illustrates an exemplary circuit for accelerating the neural network training and inference.

FIG. 18 shows a novel method described in this specification for automatically and dynamically optimizing the circuit and its parameters according to changes in runtime characteristics for neural network training.

FIG. 19 summarizes the algorithm for automatically and dynamically optimizing the circuit and its parameters according to changes in runtime characteristics for neural network training according to the method in FIG. 18.

DETAILED DESCRIPTION OF EMBODIMENTS

Figure 1:
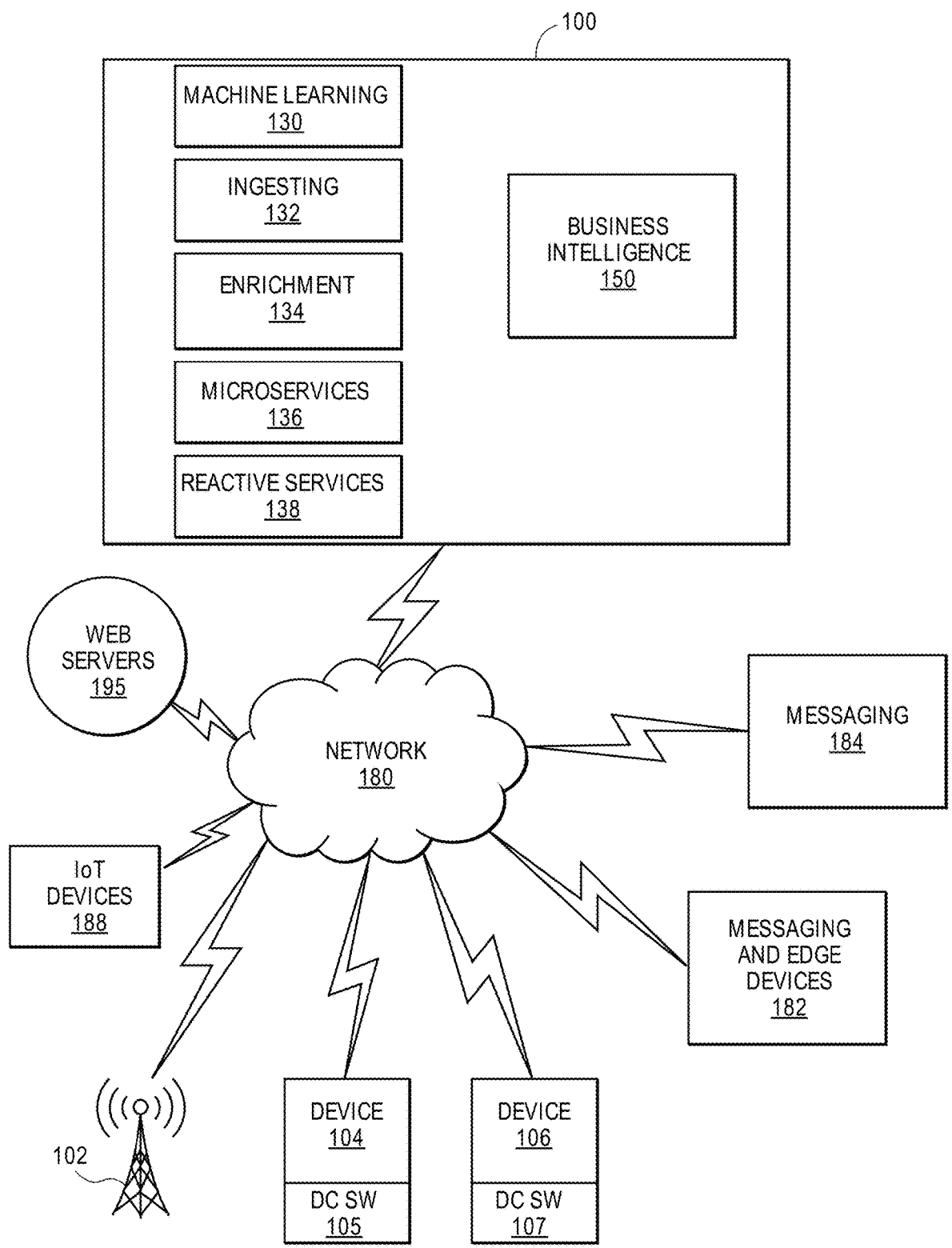
FIG. 1 shows an embodiment of a block diagram of a big data system 100 for providing big data applications for a plurality of devices in accordance with one embodiment.

Methods and systems having a heterogenous architecture for training quantized neural networks are described. The present design leverages two algorithmic properties: quantization and sparsity for quantized training. Training operations for quantized DNNs possess dual characteristics: (1) due to high sparsity in the high precision gradients, the backward phase favors sparse execution, and (2) the quantized activations/weights in the forward phase favor dense execution due to the large overhead of zero-skipping for quantized activations. The present design provides a unified architecture that leverages both properties and shows that FPGAs not only provide higher energy efficiency than GPUs, and FPGAs can, on average, outperform GPUs across a range of quantization techniques and DNN topologies.

In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

The following glossary of terminology and acronyms serves to assist the reader by providing a simplified quick-reference definition. A person of ordinary skill in the art may understand the terms as used herein according to general usage and definitions that appear in widely available standards and reference books.

HW: Hardware.
SW: Software.
I/O: Input/Output.
DMA: Direct Memory Access.
CPU: Central Processing Unit.
FPGA: Field Programmable Gate Arrays.
CGRA: Coarse-Grain Reconfigurable Accelerators.
GPGPU: General-Purpose Graphical Processing Units.
MLWC: Many Light-weight Cores.
ASIC: Application Specific Integrated Circuit.
PCIe: Peripheral Component Interconnect express.
CDFG: Control and Data-Flow Graph.
FIFO: First In, First Out
NIC: Network Interface Card
HLS: High-Level Synthesis Dataflow analysis: An analysis performed by a compiler on the CDFG of the program to determine dependencies between a write operation on a variable and the consequent operations which might be dependent on the written operation.

Accelerator: a specialized HW/SW component that is customized to run an application or a class of applications efficiently.

In-line accelerator: An accelerator for I/O-intensive applications that can send and receive data without CPU involvement. If an in-line accelerator cannot finish the processing of an input data, it passes the data to the CPU for further processing.

Bailout: The process of transitioning the computation associated with an input from an in-line accelerator to a general purpose instruction-based processor (i.e. general purpose core).

Continuation: A kind of bailout that causes the CPU to continue the execution of an input data on an accelerator right after the bailout point.

Rollback: A kind of bailout that causes the CPU to restart the execution of an input data on an accelerator from the beginning or some other known location with related recovery data like a checkpoint.

Gorilla++: A programming model and language with both dataflow and shared-memory constructs as well as a toolset that generates HW/SW from a Gorilla++ description.

GDF: Gorilla dataflow (the execution model of Gorilla++).

GDF node: A building block of a GDF design that receives an input, may apply a computation kernel on the input, and generates corresponding outputs. A GDF design consists of multiple GDF nodes. A GDF node may be realized as a hardware module or a software thread or a hybrid component. Multiple nodes may be realized on the same virtualized hardware module or on a same virtualized software thread.

Engine: A special kind of component such as GDF that contains computation.

Infrastructure component: Memory, synchronization, and communication components.

Computation kernel: The computation that is applied to all input data elements in an engine.

Data state: A set of memory elements that contains the current state of computation in a Gorilla program.

Control State: A pointer to the current state in a state machine, stage in a pipeline, or instruction in a program associated to an engine.

Dataflow token: Components input/output data elements.

Kernel operation: An atomic unit of computation in a kernel. There might not be a one to one mapping between kernel operations and the corresponding realizations as states in a state machine, stages in a pipeline, or instructions running on a general purpose instruction-based processor.

Two challenges for accelerating training for quantized DNNs have been identified including high precision for gradients and variation in computations. Gradients in the backward phase of training include both the backward propagation of loss and the calculation of weight gradients, compared to activations and weights for forward propagation. From a hardware perspective, the higher precision requirements for gradients means that an accelerator for training quantized DNNs would limit the benefits from quantizing the DNNs.

In regards to variation in computations, the highly parallel multiply add operations for convolutions/fully-connected layers are interleaved with quantization transformations and require expensive transcendental functions such as tan h or sigmoid that operate on floating-point data.

While it can be argued that the transcendental functions and the data movement operations can be offloaded to the host CPU, the latency for data-transfer for every convolution in the DNN can limit the benefits from acceleration. Furthermore, the quantization transformation and even the data-representations (e.g., fixed-point, power-of-2, floating-point) vary significantly across the different techniques proposed in recent literature, making ASIC acceleration approach less appealing. To overcome the challenges mentioned above, the present design targets FPGAs for their flexibility and develops a heterogenous architecture, which is an accelerator for training quantized DNNs. This heterogenous architecture is designed to challenge the reign of GPUs as the de facto platform for DNN training. The heterogenous architecture leverages three algorithmic properties of quantized DNN training algorithms.

In one example, compute intensive operations for the convolution and fully-connected layers in quantized training need mixed precision; that is, one of the operands is a high-precision gradient while the other is a quantized weight/activation. Using mixed-precision allows the heterogenous architecture to reduce the high resource cost of the compute units, increasing the parallelism that the FPGA can offer using its limited pool of resources.

In another example, training operations for quantized DNNs possess a dual characteristic—the high-precision gradients in the backward phase are highly sparse (>99% zeros); while the quantized activations in the forward phase have between 45-60% zeroes. The heterogenous architecture leverages the dual characteristics of high-precision, high-sparsity in the backward phase and low-precision, low-sparsity in the forward phase.

In another example, both the data-representations (fixed-point, power of 2, etc.) and precision (number of bits) for activations, weights, and gradients vary between different DNN models. The heterogenous architecture utilizes a template architecture that exploits the reconfigurability of the FPGA to generate a specialized implementation for each quantized DNN.

The heterogenous architecture acting as an accelerator utilizes the properties of quantization in the bit-heterogeneous architecture to deliver significant improvement in performance and energy efficiency over GPUs. The quantization transformation and the quantized data representation both differ for different training algorithms. However, the structure of the compute intensive convolution/activation layers remain the same. To support a wide range of quantization transformations, and yet, provide high performance for a wide range of DNNs, the heterogenous architecture uses (1) systolic arrays (e.g., sparse dense heterogenous architecture array) for the highly parallel mixed-precision Multiply-Accumulate (MAC) operations in convolution/fully-connected layers in a DNN, and (2) programmable data Transformation Arrays (TX-array) to support the resource intensive quantization transformations as well as the activation/pooling layers in DNNs.

FIG. 1 shows an embodiment of a block diagram of a machine learning system 100 for providing machine learning applications for a plurality of devices in accordance with one embodiment. The machine learning system 100 includes machine learning modules 130 (e.g., DNN modules), ingestion layer 132, enrichment layer 134, microservices 136 (e.g., microservice architecture), reactive services 138, and business intelligence layer 150. In one example, a microservice architecture is a method of developing software applications as a suite of independently deployable, small, modular services. Each service has a unique process and communicates through a lightweight mechanism. The system 100 provides big data services by collecting data from messaging systems 182 and edge devices, messaging systems 184, web servers 195, communication modules 102, internet of things (IoT) devices 186, and devices 104 and 106 (e.g., source device, client device, mobile phone, tablet device, laptop, computer, connected or hybrid television (TV), IPTV, Internet TV, Web TV, smart TV, satellite device, satellite TV, automobile, airplane, etc.). Each device may include a respective big data application 105, 107 (e.g., a data collecting software layer) for collecting any type of data that is associated with the device (e.g., user data, device type, network connection, display orientation, volume setting, language preference, location, web browsing data, transaction type, purchase data, etc.). The system 100, messaging systems and edge devices 182, messaging systems 184, web servers 195, communication modules 102, internet of things (IoT) devices 186, and devices 104 and 106 communicate via a network 180 (e.g., Internet, wide area network, cellular, WiFi, WiMax, satellite, etc.).

Figure 2A:
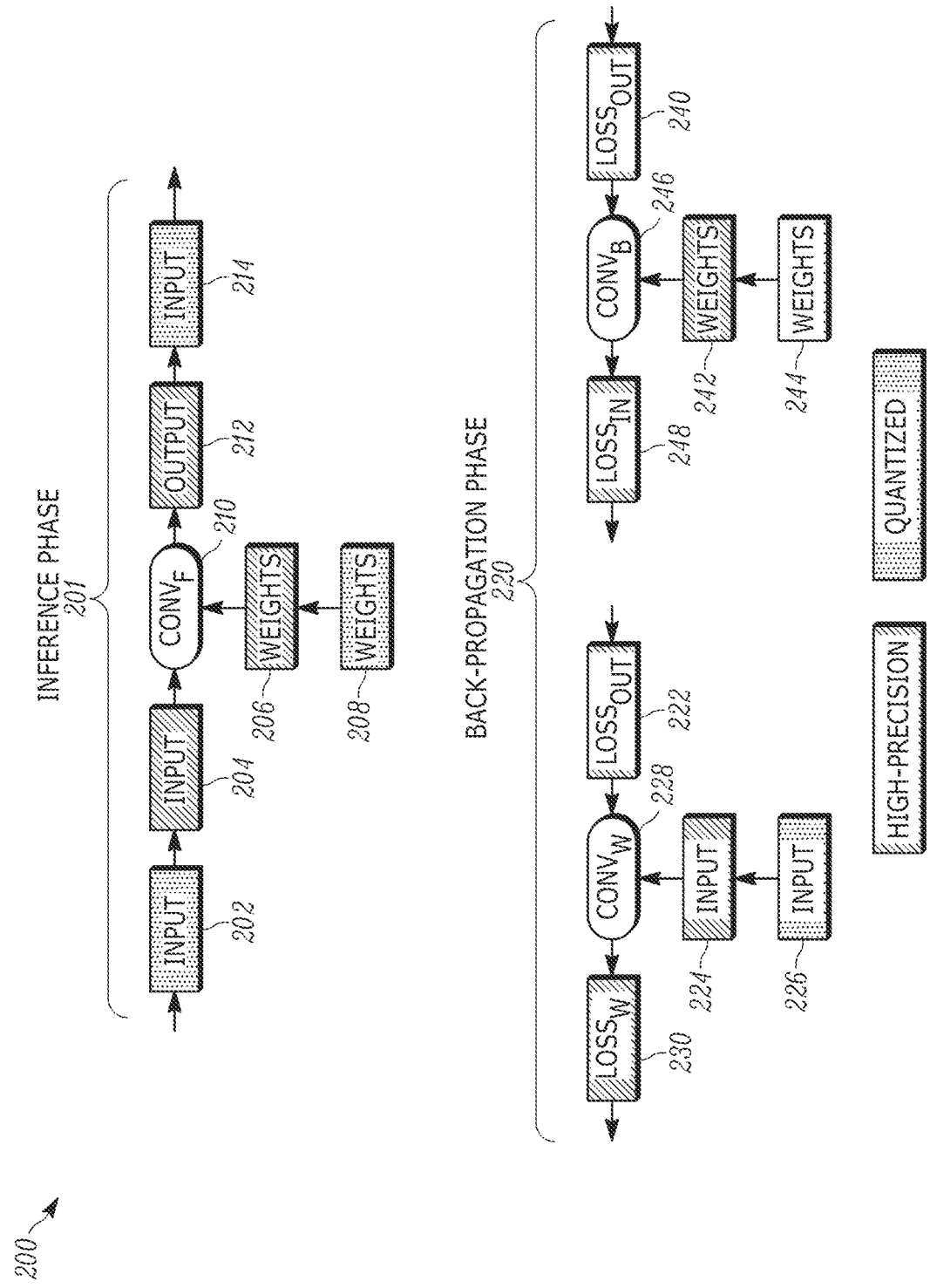
FIGS. 2A and 2B illustrate methods for training quantized DNNs with a hardware accelerator architecture (e.g., homogenous architecture in FIG. 2A, heterogenous architecture in FIG. 2B) in accordance with one embodiment.
Figure 2B:
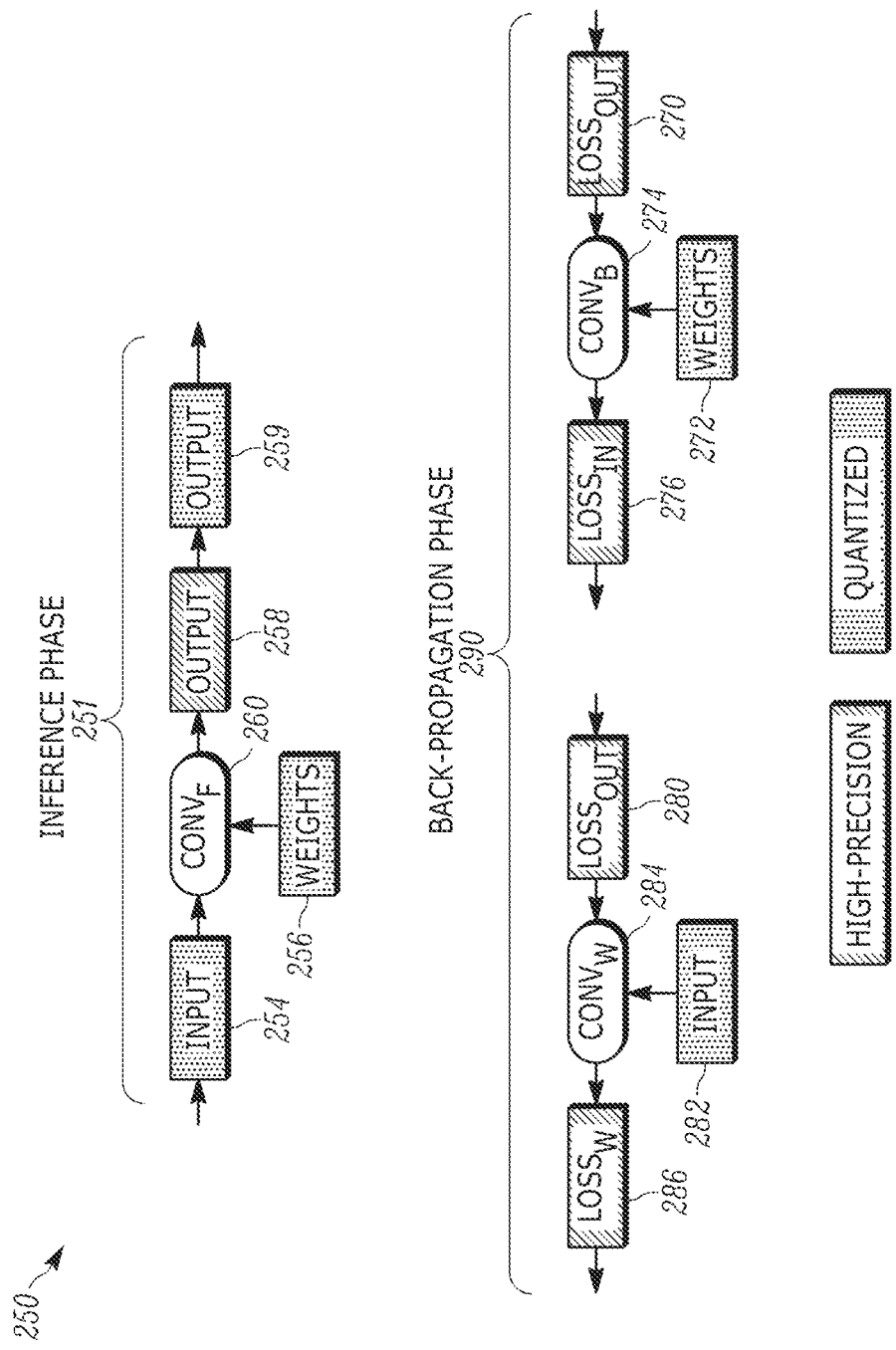

FIGS. 2A and 2B illustrate methods for training quantized DNNs with a hardware accelerator architecture (e.g., homogenous architecture in FIG. 2A, heterogenous architecture in FIG. 2B) in accordance with one embodiment. Although the operations in the methods are shown in a particular order, the order of the actions can be modified. Thus, the illustrated embodiments can be performed in a different order, and some operations may be performed in parallel. Some of the operations listed in FIGS. 2A and 2B are optional in accordance with certain embodiments. The numbering of the operations presented is for the sake of clarity and is not intended to prescribe an order of operations in which the various operations must occur. Additionally, operations from the various flows may be utilized in a variety of combinations.

The operations of the methods in FIGS. 2A and 2B may be executed by a compiler component, a data processing system, a machine, a server, a web appliance, a centralized system, a distributed node, or any system, which includes an accelerator (e.g., CPU, GPU, FPGA). The accelerator may include hardware (circuitry, dedicated logic, etc.), software (such as is run on a general purpose computer system or a dedicated machine or a device), or a combination of both.

The compute intensive convolution and fully-connected layers, which require a large number of simple MAC operations, are interleaved with resource intensive quantization transformations, which perform fewer operations but need more FPGA resources for implementing the complex operations.

FIG. 2A illustrates the various operations of method 200 to train a single quantized convolution layer when using an architecture with homogenous precision for all computations. FIG. 2B illustrates the various operations of method 250 to train a single quantized convolution layer when using an architecture with heterogenous precision for all computations.

Subscripts f, b, and w refer to the forward propagation, backward propagation of loss, and weight gradient calculations, respectively. The $conv_f$, $conv_b$, and $conv_w$ are highly-parallel convolution operations that require a large number of Multiply-Accumulate (MAC) operations.

Inference phase 201 includes operations 202, 204, 206, 208, 210, 212, and 214. Data is quantized in operations 202, 208, and 214. At operation 202, the method includes receiving input data for an input layer with the input data being quantized (e.g., quantized from a first precision datatype for input data into a second precision datatype). At operation 204, the method includes receiving the second precision datatype (e.g., high precision, 32-bit floating-point) for the input data. At operation 208, the method includes receiving a first precision datatype for the initial weights with the weights being quantized from a first precision datatype into a second precision datatype. At operation 206, the method includes receiving the second precision datatype (e.g., high precision, 32-bit floating-point) for the weights.

At operation 210, the method includes performing a convolution operation(s) ($conv_f$) of a convolution layer on the input data and weights including a large number of Multiply-Accumulate (MAC) operations. Weights from operation 206 can be applied to the input data during the convolution operations. At operation 212, output from operation 210 is generated as the second precision datatype and quantized into a first precision datatype at operation 214. The output of an output layer is available for further processing at operation 214.

The backward propagation phase 220 updates original weights to reduce a loss function to improve classification of the input data. The backward propagation phase 220 includes operations 222, 224, 226, 228, 230, 240, 242, 244, 246, and 248. At operation 240, an output loss function is generated. At operation 244, weights are quantized from a first precision datatype into a second precision datatype (e.g., high precision datatype) to form high precision datatype at operation 242. At operation 246, a convolution ($conv_b$) is performed on output from operation 240 and the second precision datatype weights from operation 242 to generate an input loss at operation 248.

At operation 222, an output loss function is generated. At operation 226, inputs are quantized from a first precision datatype into a second precision datatype (e.g., high precision datatype) to form high precision datatype at operation 224. At operation 228, a convolution ($conv_b$) is performed on output from operation 222 and the second precision datatype inputs from operation 224 to generate a weight loss function at operation 230.

In one embodiment, $conv_f$ uses low-bitwidth fixed-point data for activations and weights. In contrast, $conv_b$ and $conv_w$ may require mixed precision data types (e.g., high bit width fixed-point/floating-point) for gradients, depending on the quantization algorithm. The gradients for the $Conv_b$ and $Conv_w$ operations may require either high bit width fixed-point or floating-point datatypes, depending on the quantization algorithm. At the same time, the activations for the $Conv_w$ operation and weights for the $Conv_b$ operation may require low bit width fixed-point representation. The precision requirements are a static property of the quantized DNN, designed by the programmer/machine learning expert.

The varying precision requirements of quantized DNN training potentially provide ample opportunities to improve performance and energy-efficiency. However, exploiting this algorithmic property on hardware accelerators is challenging, since the homogeneous-precision hardware accelerators, such as GPUs, need to account for the highest precision requirements. The high precision requirement of gradients in DNN training often force the accelerators to run all the operations on the high precision such as 32-bit single-precision floating-point. Thus, even when the operations in quantize DNN training can use low-bit width datatypes (e.g., binary, ternary, etc) on a homogeneous precision architecture, the data needs to be first converted into higher precision datatypes before executing the operations on hardware. FIG. 2A shows an example in which the Input and Weights are first converted into high precision datatypes to match the high precision datatypes of gradients before performing the $Conv_f$, $Conv_b$, or $Conv_w$ operations.

In contrast, this present design introduces the use of heterogeneous precision in the accelerator design for quantized DNN training. The proposed architecture uses specialized compute units that dynamically match the varying precision requirements of quantized DNN training. As FIG. 2B shows, using heterogeneous precision enables the proposed architecture to avoid conversion to high precision datatypes and perform computations on either quantized or mixed-precision datatypes. An advantage of this design is that compute units for quantized and mixed-precision datatypes use significantly less amount of hardware resources and less energy compared to high-precision compute units. Note that the Output tensor for $Conv_f$ in FIG. 2B may still require high precision datatype to avoid overflow of the intermediate data.

Inference phase 251 includes operations 254, 256, and 258-260. Data is quantized in operations 202, 208, and 214. At operation 254, the method includes receiving input data for an input layer with the input data being quantized or a mixed precision datatype. Any low bit width precision datatypes are not converted into high bit width precision datatypes. At operation 256, the method includes receiving initial weights with the weights being quantized or a mixed precision datatype. Any low bit width precision datatypes are not converted into high bit width precision datatypes.

At operation 260, the method includes performing a convolution operation(s) ($conv_f$) of a convolution layer on the input data and weights including Multiply-Accumulate (MAC) operations. Weights from operation 256 can be applied to the input data during the convolution operations. At operation 258, output from operation 260 is generated as a second precision datatype and quantized into a first precision datatype at operation 259. The output of an output layer is available for further processing at operation 259.

The backward propagation phase 290 updates original weights to reduce a loss function to improve classification of the input data. The backward propagation phase 290 includes operations 270, 272, 274, 276, 280, 282, 284, and 286. At operation 270, an output loss function is generated. At operation 272, weights are quantized or a mixed precision datatype. Any low bit width precision datatypes are not converted into high bit width precision datatypes.

At operation 274, a convolution ($conv_b$) is performed on output from operation 270 and the weights from operation 272 to generate an input loss function at operation 276.

At operation 280, an output loss function is generated. At operation 282, inputs are quantized or a mixed precision datatype. Any low bit width precision datatypes do not need to be converted into high bit width precision datatypes. At operation 284, a convolution ($conv_b$) is performed on output from operation 280 and the inputs from operation 282 to generate a weight loss function at operation 286.

In one example, the method 200 or 250 selects output data (an output neuron of output layer) having a highest activation value as being the most likely value for the input. A highest activation value may predict a dog when an input image shows an image of a cat, instead of a dog. Additional training allows the method to predict a cat for the input image.

Figure 3A:
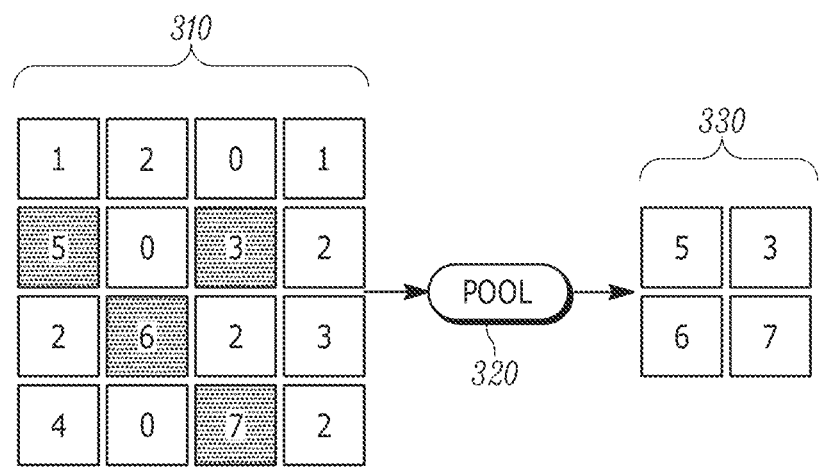
FIG. 3A illustrates pooling layers for the inference phase in accordance with one embodiment.
Figure 3B:
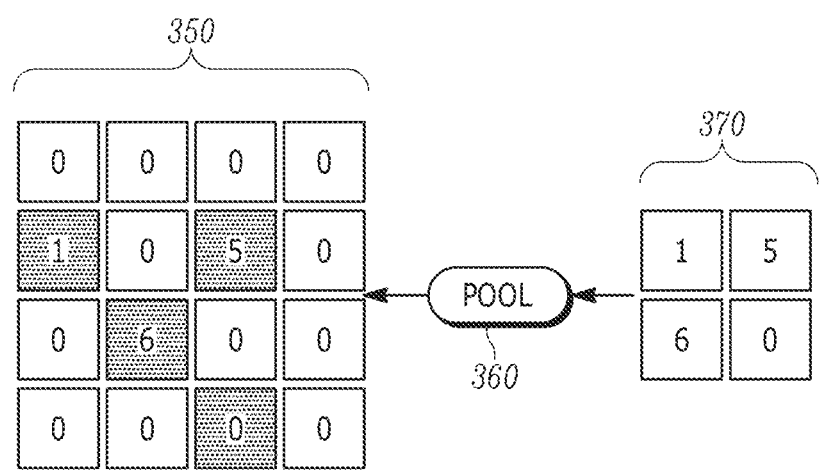
FIG. 3B illustrates pooling layers 370 for the back-propagation phase in accordance with one embodiment.

Thus far, the present design utilizes a static property of quantized DNNs, varying precision requirements, in the design of accelerators for DNN training. Additionally, the present design also exploits a run-time property of quantized DNN training that many zero-valued multiplications can be skipped in both forward and backward computations. Prior approaches have explored zero-skipping techniques for inference phase and reported that skipping zero-valued 16-bit activation values can provide significant performance benefits. The present design determines that zero-skipping for training phase opens significantly more opportunities than the inference phase, since the training phase contains a larger fraction of zero-valued multiplications among the total operations. However, seizing the opportunities via zero-skipping imposes additional hardware cost to identify and skip ineffectual multiplications. Therefore, the benefits from zero-skipping are dependent on two factors: (1) the overhead of additional logic required for skipping the computation, and (2) the number of ineffectual computations that can be skipped. In this design, the overhead for zero-skipping logic is lower on mixed-precision arrays than on quantized computations. Moreover, the backward phase of DNN training contains significantly higher zero values (e.g., up to 90%) in comparison with the zero activations of the forward phase compute (e.g., up to 45-60%). This larger number of zero valued gradients for the backward phase compared to zero-valued activations for the forward phase leads to the following analysis for FIGS. 3A and 3B. FIG. 3A illustrates pooling layers for the inference phase in accordance with one embodiment. Pooling layers 320 for the inference phase select maximum values out of a 2-D grid of inputs 310 to generate maximum inputs 330, as shown in FIG. 3A in accordance with one embodiment. FIG. 3B illustrates pooling layers 370 for the back-propagation phase in accordance with one embodiment. For the back-propagation phase, the gradients corresponding to the maximum values selected in the inference phase are non-zero while the rest are zero for grid of inputs 350. The grid 370 includes the non-zero values from the grid 350. The gradients corresponding to the negative inputs for ReLU activation (rectifier linear function) are zero, which can be as high as 50% sparsity. The heterogenous architecture specializes the computational resources to account for these runtime properties.

In regards to variation in runtime characteristics, while quantization is a static property of a DNN, sparsity—the % of zero-valued activations—in the forward or backward computations is a run-time property. Quantization reduces the size of multipliers required and exploiting sparsity requires an area overhead for zero-skipping. Prior art references have shown performance improvements when skipping zero-valued activations for the inference phase when using 16-bit data representations.

The present design utilizes the interplay between quantization and sparsity and defines $sparsity_{minimum}$ as the minimum number of zero-valued activations or gradients required to break-even from the overhead of zero-skipping with $sparsity_{minimum}$ being defined as follows.

$$sparsity_{minimum} = 1 - (1/overhead_{zero\ skipping}). \quad (1)$$

Note that $sparsity_{minimum}$ in the above formulation assumes an ideal architecture that can skip all zero-valued computations and serves as a reference to evaluate the potential benefits from zero-skipping.

A compute intensive convolution and fully-connected layers, which require a large number of simple MAC operations, are interleaved with resource intensive quantization transformations, which perform fewer operations but need more FPGA resources for implementing the complex operations. The quantized training requires additional operations that transform the activations, weights, and gradients to different data representations. The type of quantization transformation varies according to the quantization algorithm. Offloading these operations to the host CPU would lead to high latencies.

Figure 5:
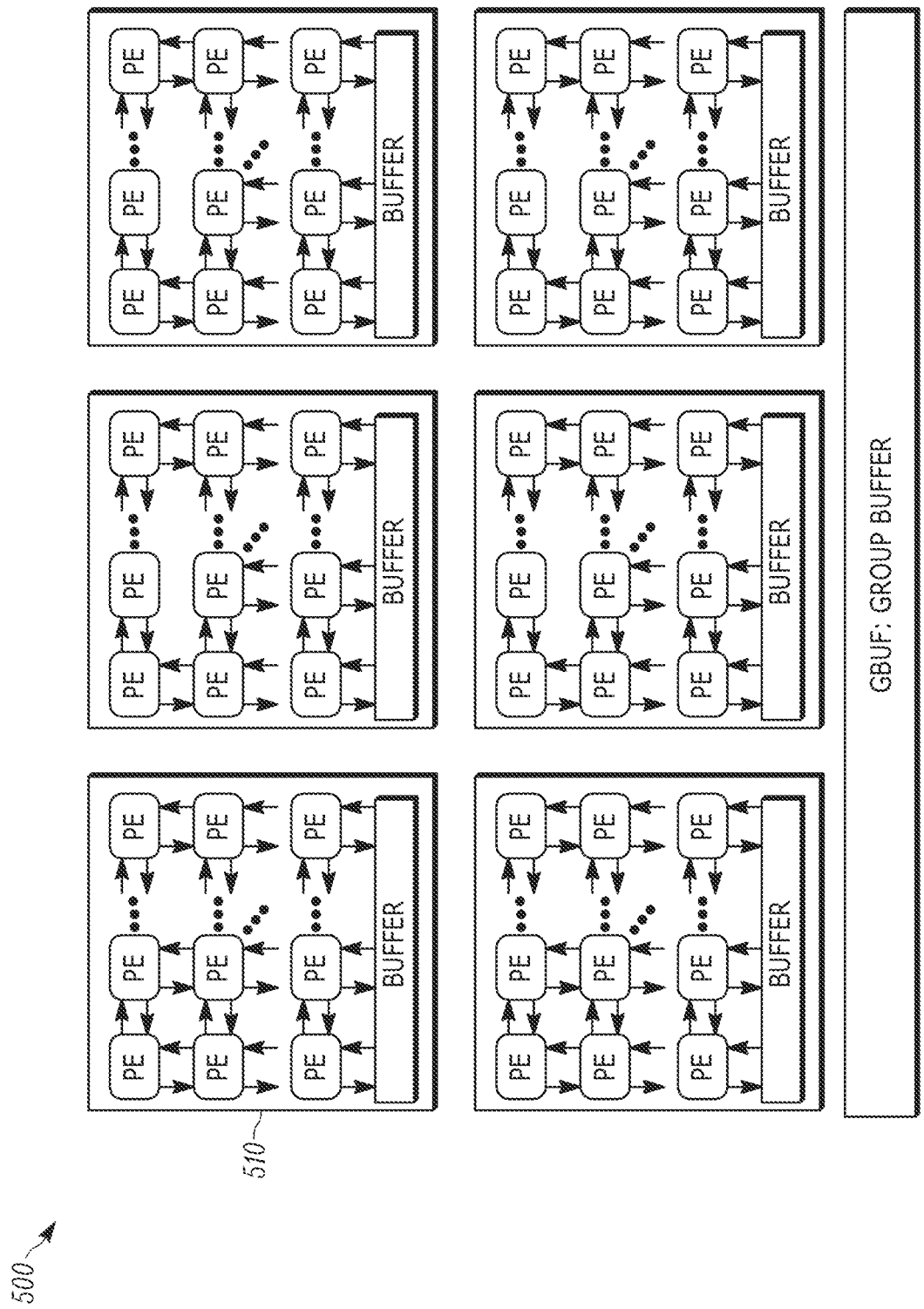
FIG. 5 illustrates a homogeneous accelerator architecture 500 in accordance with one embodiment.

Thus, a homogeneous accelerator architecture 500 of FIG. 5 would overprovision resources for the different types of operations using a homogeneous set or array 510 of Processing Engines (PEs), and more importantly, (2) would be unable to exploit the algorithmic characteristics of reduced precision from quantization and high sparsity in back-propagated gradients. Therefore, heterogeneity is important to maximize the potential performance benefits using the limited pool of resources on a FPGA die. Motivated by the above insight, a heterogeneous architecture for accelerating quantized training has been designed.

The present design utilizes a template architecture that is both scalable—to maximally utilize the FPGA's on-chip resources, and customizable—to adapt to the precision requirements of the quantized DNN being trained.

Figure 4:
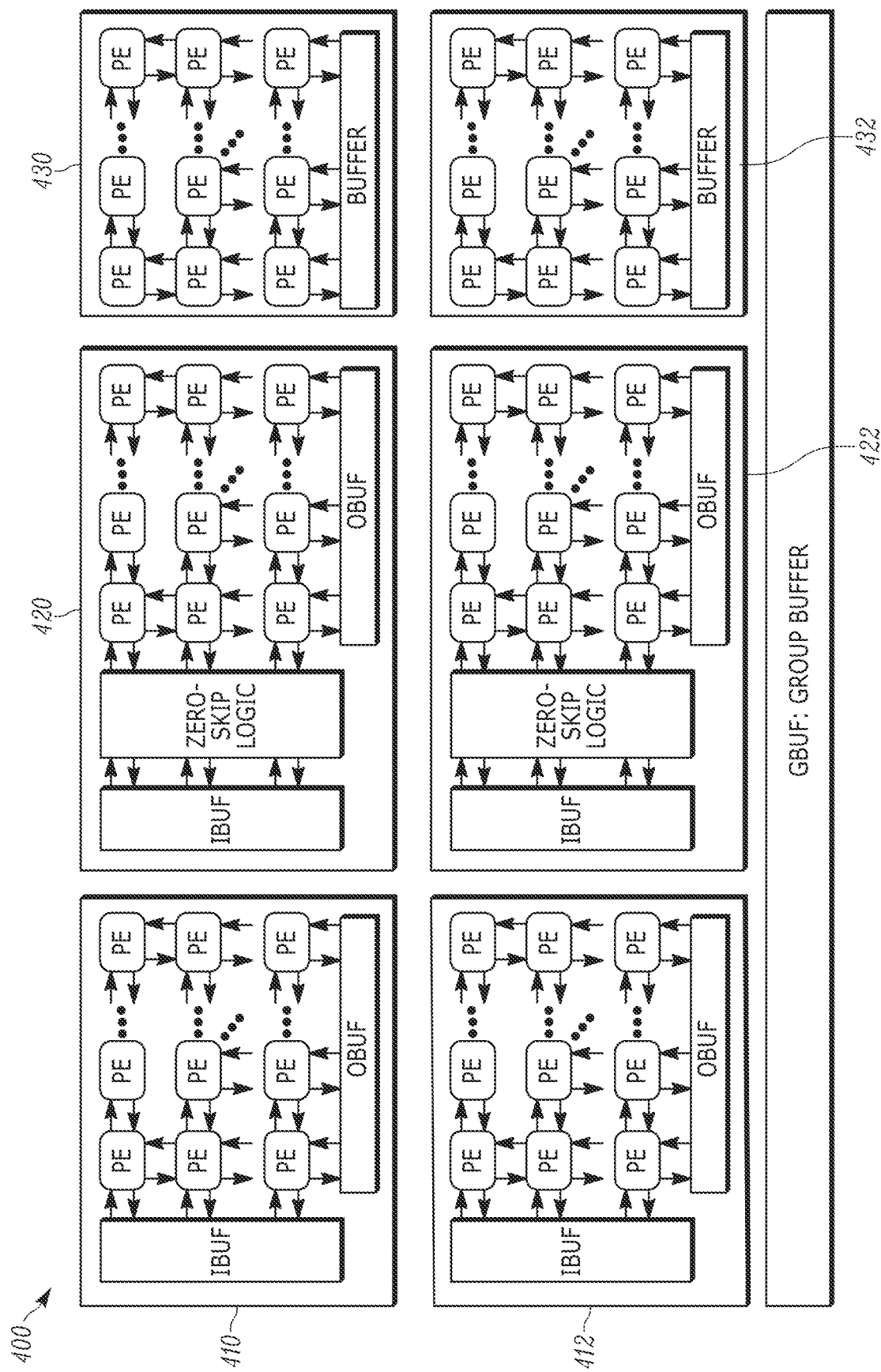
FIG. 4 illustrates an architecture 400 that includes three distinct types of computational blocks 410, 420, and 430 that are specialized for the different types of operations for training quantized DNNs in accordance with one embodiment.

This heterogenous architecture 400, as shown in FIG. 4, includes three distinct types of computational blocks 410, 420, and 430 that are specialized for the different types of operations for training quantized DNNs. A Dense Quantized Array 410, 412 (DQ-array), which is a systolic array (e.g., 16×16 systolic array) of low bit width multiply-accumulate computation units that are labeled as processing engines (PEs) in one example, includes an input buffer, an output buffer, and the PEs.

A mixed precision zero skipping array 420, 422 (MPZS-array), which is a systolic array (e.g., 16×16 systolic array) of mixed-precision multiply-accumulate computation units that are labeled as processing engines (PEs), includes an input buffer, zero skip logic, an output buffer, and PEs.

Array 430, 432, which is an array (e.g., 4×4 array) of floating-point processing engines (PEs), includes a buffer and the PEs. The arrays 410 and 420 are specialized for the highly parallel multiply-add operations in the forward and backward phases of DNNs, while the array 430 is a more general purpose array that can be programmed to either compute element-wise data transformations necessary for quantized training.

While FPGAs run at a much lower frequency than contemporary processors like CPUs or GPUs, the FPGAs offset the lower frequency by offering high degrees of parallelism for the accelerator. Feeding data to the large number of compute units in the FPGA within the FPGA's limited off-chip bandwidth is challenging, especially due to large memory footprint of DNNs. Fortunately, DNNs have a large degree of data reuse. To utilize the data-reuse for training quantized DNNs, the present design uses a three level memory hierarchy: global, cluster, and local memory (e.g., global-uram, cluster-bram, and local-bram). Unlike caches in CPUs or GPUs, the memory at each level of the hierarchy is controlled by software, making it a scratchpad memory. Using the on-chip memory as scratchpads takes away the burden of prefetching and evicting from the hardware and places it on the software. This enables layer-specific compiler optimizations that take advantage of data-reuse within layers of the quantized DNN.

The present application will now describe the microarchitecture of the heterogenous architecture 400, and an algorithm for optimizing the sizes of the three types of arrays to maximize performance.

As previously described herein, the runtime characteristics for the forward and backward phases of quantized training differ significantly. To this end, the present heterogenous architecture uses a MPZS-array that exploits the dual characteristics of high sparsity for the high precision gradients for zero-skipping in the backward phase, and uses a dense quantized execution for the forward phase. The basic building block for the MPZS-array is the CU, which is a bit-flexible compute unit, described below.

Figure 6:
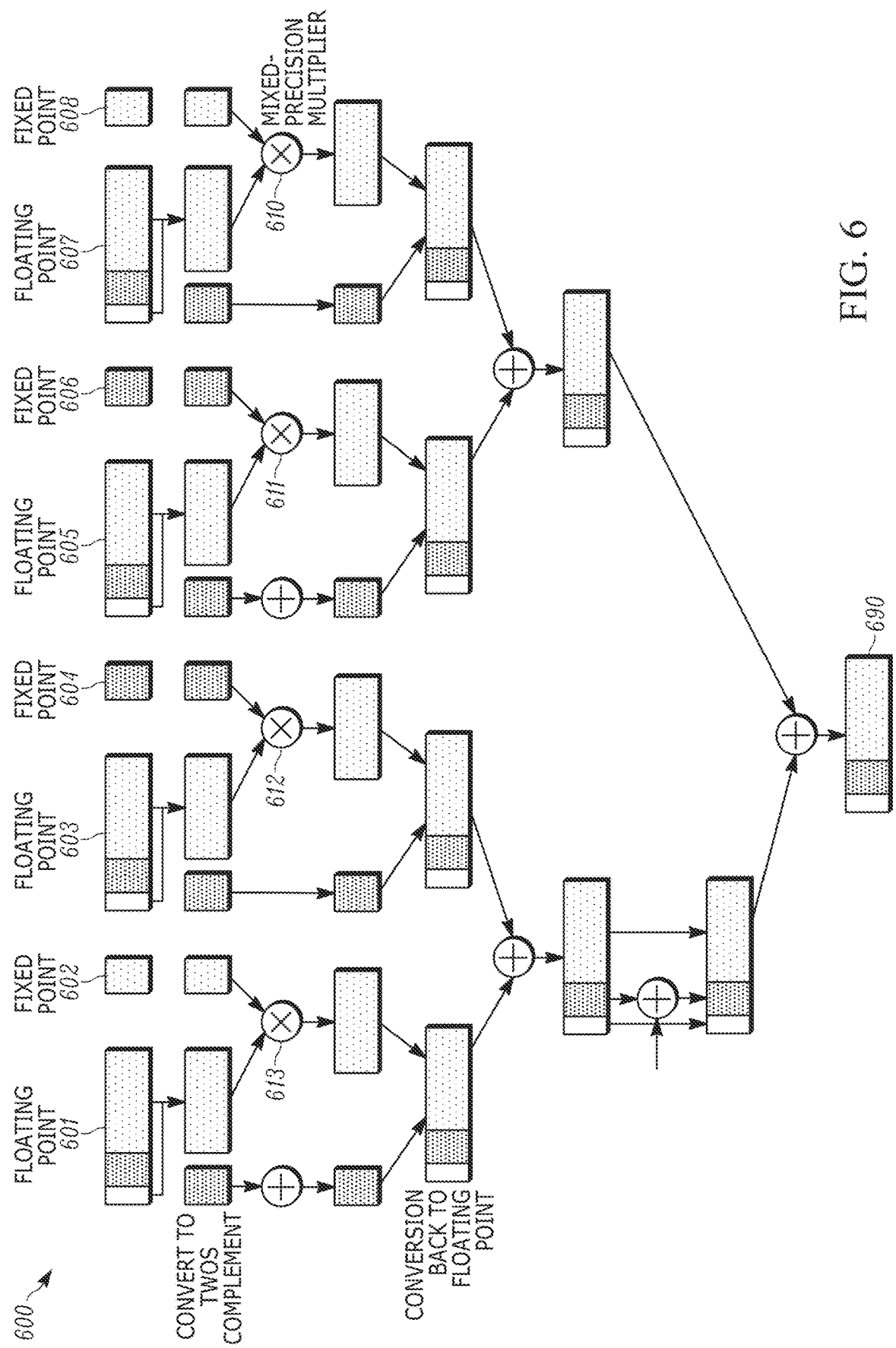
FIG. 6 illustrates the design of a compute unit in accordance with one embodiment.

FIG. 6 illustrates the design of a compute unit in accordance with one embodiment. The CU 600 includes n quantized mixed precision multipliers (e.g., 610-613), each of which can multiply up to m-bit operands. While m depends on the minimum precision required by the MAC operations in convolution/fully-connected layers, n depends on the ratio of $precision_{max}/precision_{min}$. The outputs of the n quantized multipliers are added to produce an output 690. The CU supports a flexible range of precision for the floating point or fixed point inputs 601-608 (e.g., floating point 32 bit 601, fixed point 2 bit 602, floating point 32 bit 603, fixed point 2 bit 604, floating point 32 bit 605, fixed point 2 bit 606, floating point 32 bit 607, fixed point 2 bit 608)—activations in the forward phase and the gradients in the backward phase. At the lowest precision mode, the n quantized multipliers in a CU perform n independent multiplications. At the highest precision mode, the n quantized multipliers together multiply a single n×m-bit operand with a m-bit operand. In this example, a MPZS array uses a 2D systolic array of 16×16 CUs.

In the dense forward execution mode, each compute unit in the MPZS array performs multiple multiply-add operations for quantized activations and weights in the forward phase of training. The partial results generated by different quantized multipliers are added together to produce a single output.

As discussed, the gradients in the backward phase for DNNs have high sparsity (e.g., up to 99%). A naive first approach for obtaining performance for such a high degree of sparsity is to serialize the MAC operations using a single row of the systolic array. Such an approach has two drawbacks: (1) each row would require its own single-precision floating point accumulator which would increase the resource cost (FPGA LUT/DSP) per row; and (2) limited parallelism due to a single row.

A second approach is to use multiple rows in the systolic array, which increases parallelism. Further, outputs within each column of the systolic array can be accumulated in a single floating-point accumulator. The drawback of the second approach is that it enforces synchronization between different rows of the systolic array. That is, each row waits for all the other rows to finish computing the current output before moving on to the next output. Prior work uses the second approach to improve inference performance when the sparsity for activations is between 45-60%. The present design on the other hand aims to exploit the considerably higher sparsity present in the gradients of the backward phase of quantized DNN training. Due to the high sparsity in the gradients for the backward phase, synchronization between different rows of the systolic array would significantly limit the performance benefits from zero-skipping.

The present design identifies two limitations of the above technique when applied to highly-sparse gradients. The fundamental assumption here is that the compute units in each column synchronize and operate on a single sparse-vector. Therefore, for the first limitation, each row stalls for all the other rows to finish operating on their own sub-vectors before proceeding to the next sparse-vector; which will limit the potential benefits from zero-skipping due to the high-sparsity in gradients.

For the second limitation, when reading one sparse sub-vector at a time from the memory (e.g., BRAM), the non-zero detect logic will stall when there are no non-zero values in the sub-vector. Assuming a 95% sparsity in gradients, the probability of all zeros in a sub-vector (assuming independent and identical distribution) is 44%.

Figure 7:
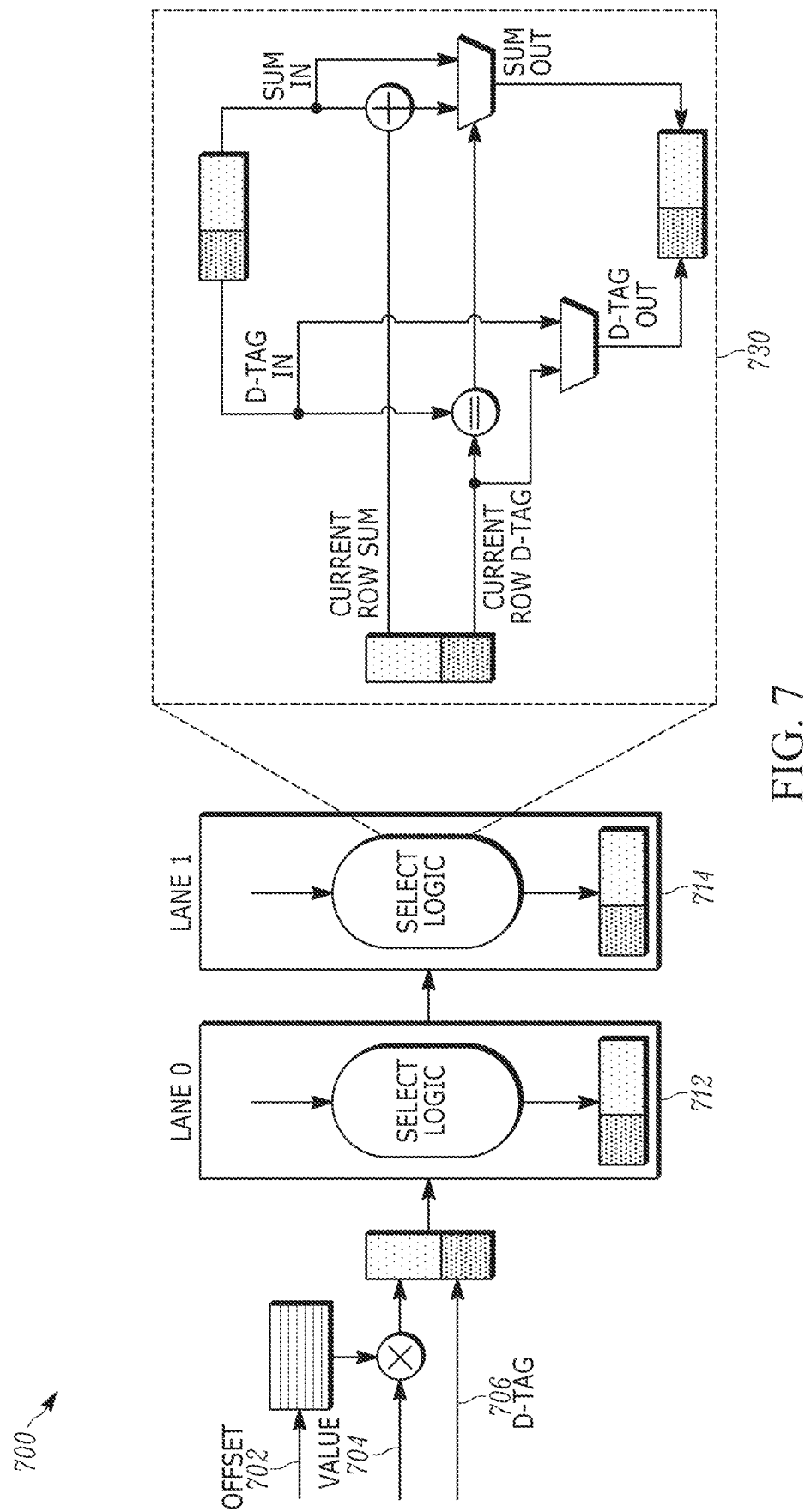
FIG. 7 illustrates adder logic 700 that utilizes a novel low-overhead desynchronized encoding for zero-skipping in accordance with one embodiment.

To overcome the above second limitation, the present design utilizes a novel low-overhead desynchronized encoding for zero-skipping as illustrated in a multi-lane adder logic 700 of FIG. 7. This encoding uses a desynchronization-tag or d-tag 706 to remove synchronization between rows of a MPZS-array. MPZS-array encodes the non-zero values as value 702, offset 704, and d-tag pair 706. The d-tag 706 specifies the identification (ID) of the sparse-vector that each row operates on. To take advantage of the proposed desynchronized encoding in MPZS-array, the present design uses two tag-lanes 712 and 714 within each column. The compute units in each column share tag-lanes. Within each column, compute units forward their results to one of the tag-lanes using the LSB of the d-tag. When the select logic 730 determines that the tag for the current row matches the previous row's tag for either the odd or even tag-lanes, the values are added together and forwarded to the next row. When the tags do not match, the results are stored locally.

Figure 8:
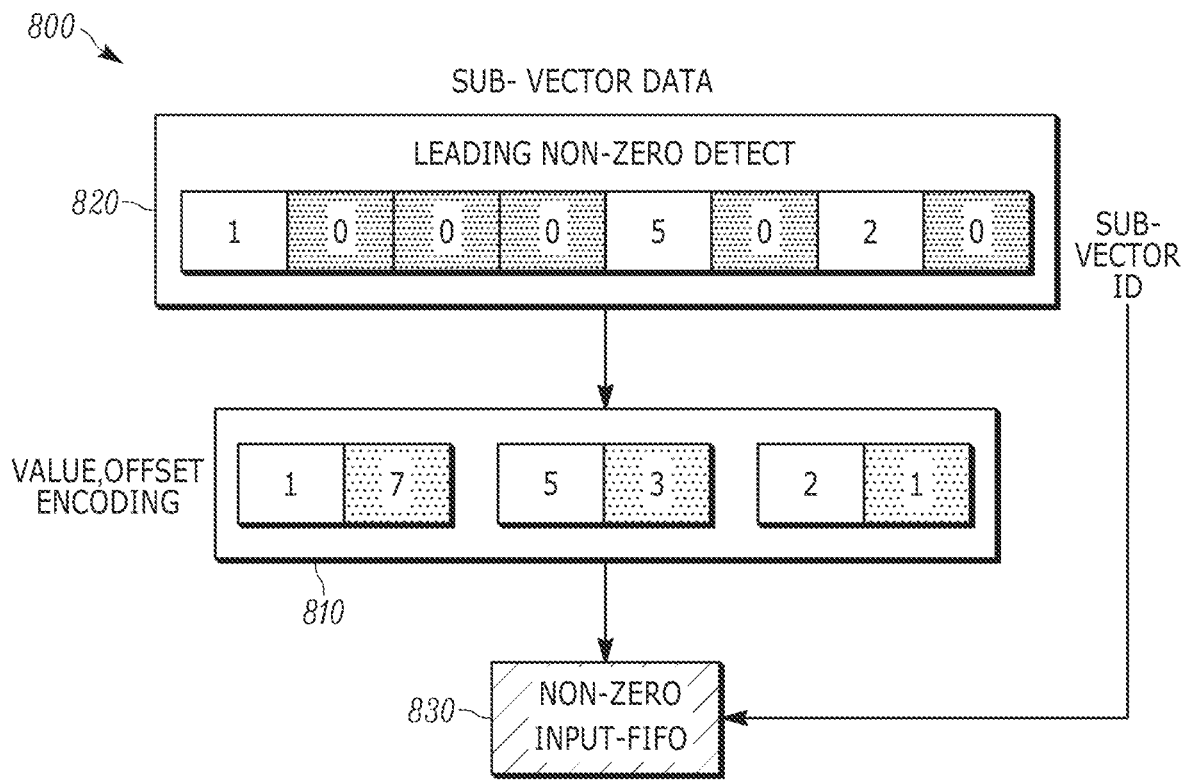
FIG. 8 illustrates non-zero detection logic 800 that includes zero-detector logic 810 and non-zero selector 820 in accordance with embodiment.

To overcome the first limitation, the present design decomposes the non-zero detection logic 800 of FIG. 8 into two different modules: (1) zero-detector logic 810, and (2) non-zero selector 820. The zero-detector logic includes a series of comparators that generate a bit-vector that corresponds to using a single bit for each bit of the sub-vector (e.g., 16 bit wide sub-vector). Each bit in the bit-vector specifies if the corresponding value in the sub-vector is zero (low) or non-zero (high). When all bits in the bit-vector are low, the sub-vector is skipped entirely. Otherwise, the sub-vector is pushed to a FIFO queue 830, along with its bit-vector and a d-tag for identifying the input ID. The non-zero selector then pops the FIFO queue to read only those sub-vectors that have some non-zero values. The non-zero selector then selects the first non-zero value and the corresponding offset to produce a (value, offset, tag) pair. Using desynchronization and sub-vector skipping, the present design improves the performance of MPZS-array when sparsity is high.

While these two techniques improve performance, these techniques also increase the consumption of FPGA's LUT resources. As discussed herein, the resource overhead of sparsity outweighs the benefits from zero-skipping in the forward phase that uses low bit width activations for quantized DNNs. Therefore, the MPZS-array utilizes a dense execution for the forward phase of quantized DNN training, as described below.

The present design uses a template architecture to implement the MPZS-array on FPGA. The precision for the multiply-add operations can be modified according to the needs of the quantized DNN.

The following section discusses the scheduling of operations for quantized training across multiple MPZS-arrays. In order to parallelize the operations for training a quantized DNN across multiple MPZS-arrays, the present design splits the computations in each operation into tiles. For most operations required for training quantized DNNs, the total amount of data is often much larger than the limited on-chip memory available on the FPGA. Therefore, splitting the computations into tiles are necessary to fit the data into on-chip memory.

Figure 9:
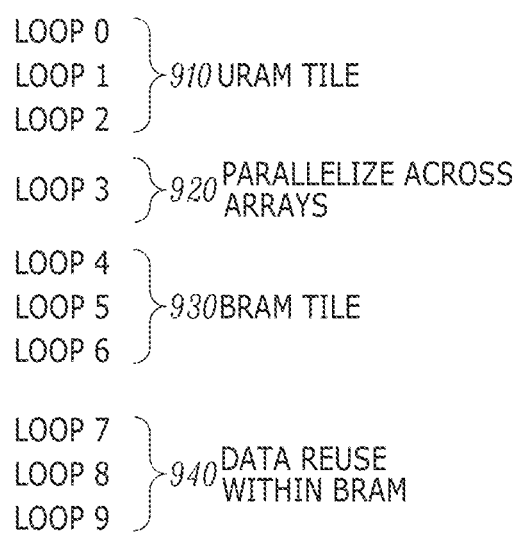
FIG. 9 illustrates scheduling operations across multiple MPZS-arrays in accordance with one embodiment.

FIG. 9 illustrates scheduling operations across multiple MPZS-arrays in accordance with one embodiment. To maximize the performance of the MPZS architecture, the present design uses three types of tiling and expresses the task of determining the tile sizes as a constrained optimization problem. The three types of tilings correspond to three levels of memory hierarchy in the MPZS architecture and the sizes of each level of memory hierarchy serves the constraints for optimizing the tile sizes. The present design uses a simple fully-connected layer in FIG. 9 as an example to explain the scheduling of operations 910, 920, 930, and 940. The fully-connected layer from the FIG. 9 can be expressed as a matrix multiplication as follows.

$$\text{output}(B \times Cout) = \text{input}(B \times Cin) \times \text{weights}(Cin \times Cout) \qquad (2)$$

FIG. 9 shows how the operations in a fully-connected layer are split into tiles for each level of memory hierarchy including global memory tile (e.g., URAM tile) at operation 910 and cluster memory tile (e.g., BRAM tile) at operation 930. Using a larger tile size for each level of hierarchy increases the data reuse at that level of hierarchy at operation 940. The tile sizes are constrained by the capacity of memory at that level of hierarchy.

Figure 10:
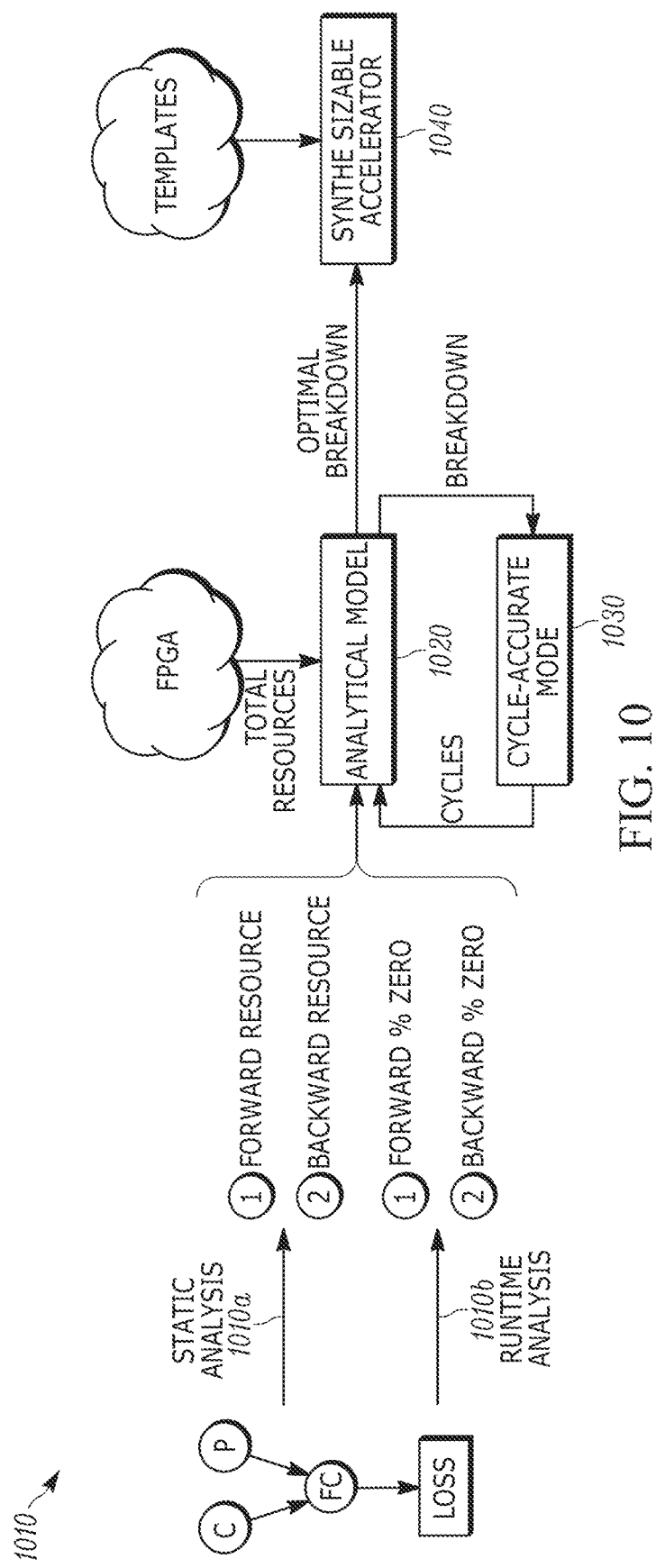
FIG. 10 illustrates an overview of a DNN workflow 1000 in accordance with one embodiment.

Next, an overview of a DNN workflow 1000 is illustrated in FIG. 10 in accordance with one embodiment. The DNN workflow begins with a programmer defining a Dataflow Graph (DFG) of the DNN using a high-level API. This API allows the programmer to specify the precision for each operation in the DNN. As shown in the FIG. 10, this workflow includes four operations: (1010) a dataflow analysis operation to analyze the resource requirements for the dataflow graph, (1020) a resource partitioning operation to analytically split the FPGA's resources, (1030) a cycle-accurate scheduling operation to obtain cycle counts, and (1040) a builder operation to generate a synthesizable accelerator using the optimal resource breakdown from operation 1030. Below, we describe the four operations in detail.

For static analysis, the first operation 1010 of the workflow includes analyzing the type of computational resources required by the DNN model. This operation 1010a includes the dataflow analyzer component iterating over the nodes of the dataflow graph of the DNN and generates a list of pairs (e.g., operation type, precision, operation count) for the forward and backward passes of training. In one example, the operation type is a type of scalar operation (e.g., multiply, add, etc), the precision field is a tuple of the data-types required by the operands (e.g., fixed-point, floating-point, or power-of-2), and the operation count field describes the number of scalar operations. Next, the dataflow analyzer generates the highest and lowest precision required for the forward pass and repeats the same for the backward pass. Determining the range of precision requirements is essential for estimating the resources required for compute units in the FPGA (e.g., LUTs, DSPs, and Flip-Flops).

While static analysis determines the static utilization of the FPGA's resources, runtime analysis is essential to estimate the dynamic utilization considering that a large number of multiply-add operations in a DNN are ineffectual due to one of the operands being zero. At operation 1010b, the dataflow analyzer performs runtime analysis by sampling the data propagated in the forward and backward passes of the dataflow graph for numerous iterations using a user-specified batch-size of inputs. Next, the dataflow analysis calculates the proportion of zero-valued data in sampled data. Using the information generated by the static and runtime analysis in the dataflow analysis operation, the resource partitioning component divides the FPGA's resources as follows at operation 1020.

The resource partitioner component of the workflow uses an analytical model to obtain the optimal breakdown of the FPGA's resources for forward and backward passes. Since most operations in a DNN are Multiply-Accumulate (MAC) operations, the resource partitioner only considers the MAC operations for the analytical model. For a given pair of ($precision_{fwd}$, $ops_{fwd}$) and ($precision_{bwd}$, $ops_{fwd}$) for the forward and backward passes of training, the resource partitioner generates the optimal breakdown (p, 1−p) of FPGA's resources for executing forward and backward passes, respectively.

$$alu_{fwd} = p \times resource_{total}/resource_{fwd} \quad (3a)$$

$$alu_{bwd} = (1-p) \times resource_{total}/resource_{bwd} \quad (3b)$$

Where $resource_{fwd}$ and $resource_{bwd}$ are obtained from synthesizing compute units with $precision_{fwd}$ and $precision_{bwd}$, respectively. Next, the resource partitioning component opti-mizes the ideal number of cycles required by the forward and backward operations given by the following equation:

$$Cycles_{total} = ops_{fwd} \times nz_{fwd}/(alu_{fwd}+alu_{bwd}) + (ops_{bwd} \times nz_{bwd})/alu_{bwd} \quad (4)$$

Using equations [3b] and [3b], equation [4] solved quadratically to get the optimal partitioning p as follows.

$$\text{Minimize } p \; cycles_{total}(p), p \in [0,1) \quad (5)$$

$$p = -c + 1/c \times r - 1 + \text{square root}((c+1)2/(c \times r-1)2 - c - r/r \times (c \times r-1)) \quad (6)$$

$$\text{where } c = ops_{bwd} \times nz_{bwd}/(op_{fwd} \times nz_{bwd}) \quad (7)$$

$$r = resource_{bwd}/resource_{fwd} - 1 \quad (8)$$

Here, the c term is the ratio of non-zero computations in the backward pass to the non-zero computations in the forward pass, and r term is the one minus the ratio of resources required for the backward pass to the resources required by the forward pass. While computing the value of r requires static information, computing c requires both static and dynamic information.

The value of p obtained from equation [6] is the optimal breakdown of the FPGA's resources assuming no under-utilization of resources due to memory accesses. In reality, however, even quantized DNNs have a large memory footprint and hence performance of the generated FPGA accelerator depends both on the breakdown of the FPGA's resources and the organization of on-chip memory. Nevertheless, the value of p obtained from equation [6] serves as a good initial solution for optimizing the breakdown of the FPGA's resources.

Next, the scheduler component evaluates the solution provided by the resource partitioner. The scheduler is the third component of the workflow which evaluates the quality of the solution generated by the resource partitioner. The present design uses an architectural vs cycle-accurate simulation model for determining the quality of the partitioning solution. First, the simulator component divides the FPGA's LUT and DSP resources into 16×16 systolic arrays for the forward and backward passes using the p obtained from the resource partitioner.

Next, the simulator evenly divides the FPGA's memory (e.g., URAM and BRAM) resources for each systolic array. The architecture of the present design uses a 2 level hierarchy for organizing the on-chip memory, as discussed above. Finally, using the number of forward and backward systolic arrays along with the memory organization, the simulator component performs cycle-accurate simulation. The simulation model accounts for limited bandwidth and latency for communication over both PCIe and the off-chip DRAMs. The scheduler generates the cycle counts for DQ-array and MPZS-array. Using the cycle-counts, the scheduler updates the compute ratio c defined in Equation [7] as follows.

$$cnext = cyclesDQ\text{-}array/cyclesMPZS\text{-}array \quad (9)$$

The scheduler then feeds back the updated compute ratio to the resource partitioner. Algorithm 1 summarizes the tasks of the Dataflow Analyzer, Resource Partitioner, and Scheduler. Since the present design aims to flexibly support a wide range of quantized training algorithms, it uses a template architecture to accelerate a wide range of quantized DNNs. The first three components generate an optimized set of parameters for the template architecture along with an optimized execution schedule. The last component, the builder generates a synthesizable accelerator using both the optimized set of architectural parameter and execution schedule.

---

Algorithm 1: heterogenous resource partitioning

Inputs : D: DFG of the quantized DNN
$resource_{total}$ : FPGA's total resources
Output : p: Optimal breakdown of resources for DQ-array
schedule: Schedule of operations for the optimized p
arg min : $cycles_{total}$ : The total execution cycles for one training iteration
Function AnalyzeDFG(D)
//Static Analysis
//Number of operations in forward/backward
$ops_{fwd}$, $ops_{bwd}$     <− D ---
Algorithm 1: heterogenous resource partitioning
---

```
// Tuple of precision per layer
  precision_fwd        <-      ops_fwd
  precision_bwd        <-      ops_bwd
  LUT/DSP resources for forward operations
  resource_fwd<-
                       precision_fwd
  resource_bwd         <-      precision_bwd
  Runtime analysis
  nz_fwd, nz_bwd       <-      execute(D)
  Obtain c and r
c <- opbwd x nzbwd /
opf wd x nz f wd
r <- resourcebwd/resource f wd -1
return c, r
end
Function Partition(c, r)
return p = - c+1 / cxr-1 +r squareroot ((c+1)2/(cxr-1)2 - c-r /rx(cxr-1))
end
Function Schedule(D, p)
// Schedule and estimate cycles for forward/backward phase
cycles f wd, cyclesbwd <- Model(D, p)
return cycles f wd, cyclesbwd
end
Initialize c, r AnalyzeDFG(D)
cycles f wd, cyclesbwd Schedule(D, p)
cnext <- cyclesbwd / cycles f wd
// Refine the partitioning Initialize cnext <- - infinity
Do
p < - Partition(c, r)
cycles f wd, cyclesbwd < - Schedule(D, p)
cnext < - cyclesbwd / cycles f wd
while abs value( c-cnext ) > epsilon;
```

| Benchmark | Quantization | Dataset | Batch Size | # of Ops (per-batch) | # of parameters |
|---|---|---|---|---|---|
| AlexNet-D | DoReFa-Net | ImageNet | 128 | 8,256 Mops | 62M |
| SVHN-D | DoReFa-Net | SVHN | 128 | 342 Mops | 62M |
| AlexNet-D | QNN | ImageNet | 512 | 2067 Mops | 50M |
| Cifar-10-Q | QNN | Cifar-10 | 50 | 1,844 Mops | 12M |
| SVHN-Q | QNN | SVHN | 200 | 469 Mops | 5M |
| GoogleNet-Q | QNN | ImageNet | 64 | 4777 Mops | 56M |
| AlexNet-W | WRPN | ImageNet | 54 | 31,503 Mops | 108M |
| ResNet-W | WRPN | ImageNet | 64 | 12025 Mops | 23M |

Table I shows the evaluated benchmarks, their datasets, number of operations, model size, and final accuracy. The postfix -W, -Q, -D refer to quantization techniques proposed by different prior approaches that use uniform quantization using fixed-point representation for activations and weights but use different quantization strategies for gradients. For gradients, DoReFa-Net uses fixed-point quantization with added gaussian noise, QNN uses logarithmic quantization using a power-of-2 data representation, and WRPN uses floating-point. Benchmarks ResNet-34-W, GoogleNet-Q, AlexNet-Q, AlexNet-W, AlexNet-D are image classification models trained on the Imagenet 2012 dataset. Benchmarks SVHN-W and SVHN-Q are optical character recognition models based on the SVHN dataset. Unlike inference, the quality of the trained model depends significantly on the batch size. Therefore, the same batch sizes reported in these prior approaches is used for both GPUs and the heterogenous architecture of the present design. Furthermore, the three benchmarks use stochastic noise to speed-up convergence. Across all the benchmarks, both performance and power consumption are measured for a FPGA platform and a GPU platform for 10,000 training iterations and present the average. For both GPU and FPGA implementations, the host CPU is used as the parameter server.

A FPGA platform includes 6840 DSPs, 1182K LUTs, 33.7 MB URAM, 8.4 MB BRAMs, 42 W TDP, 200 MHz frequency, and 16 nm technology node. A GPU platform has 3584 cores, 12 GB memory, 250 W TDP, 1531 MHz frequency, and 16 nm technology node.

Figure 11:
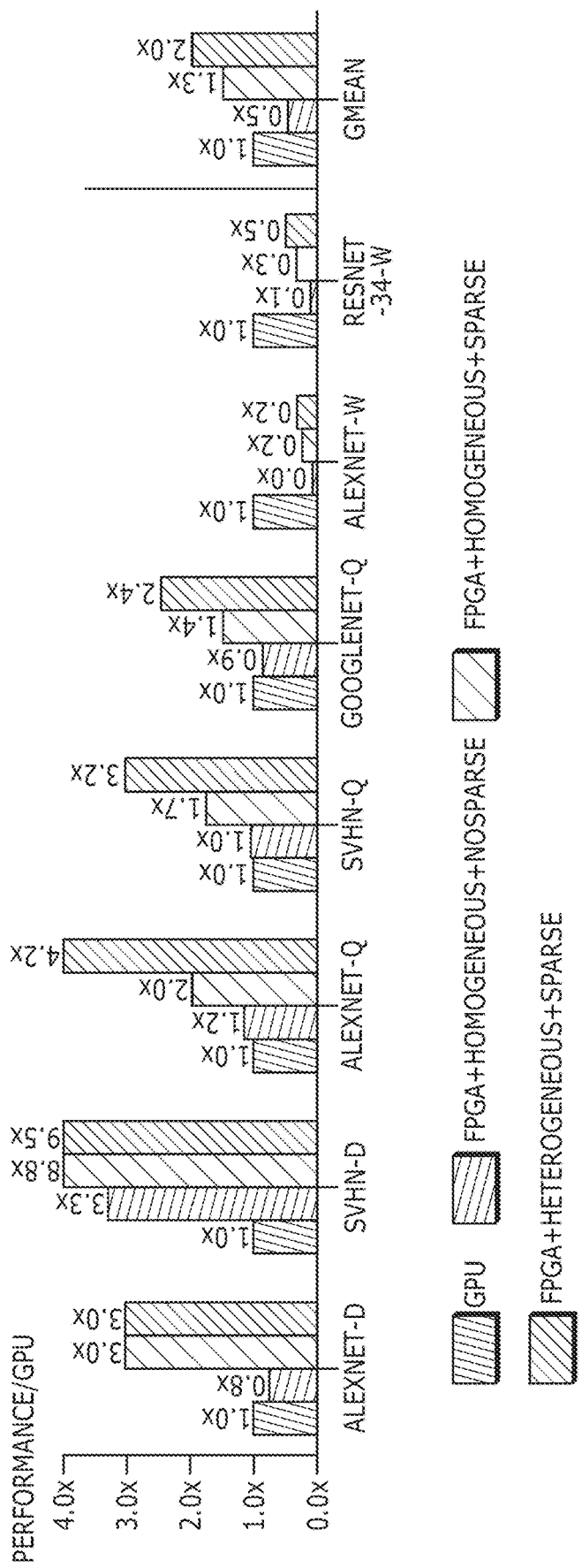
FIGS. 11 and 12 illustrate performance of the GPU platform in comparison to different variations of the present design as implemented in a FPGA platform in accordance with one embodiment.
Figure 12:
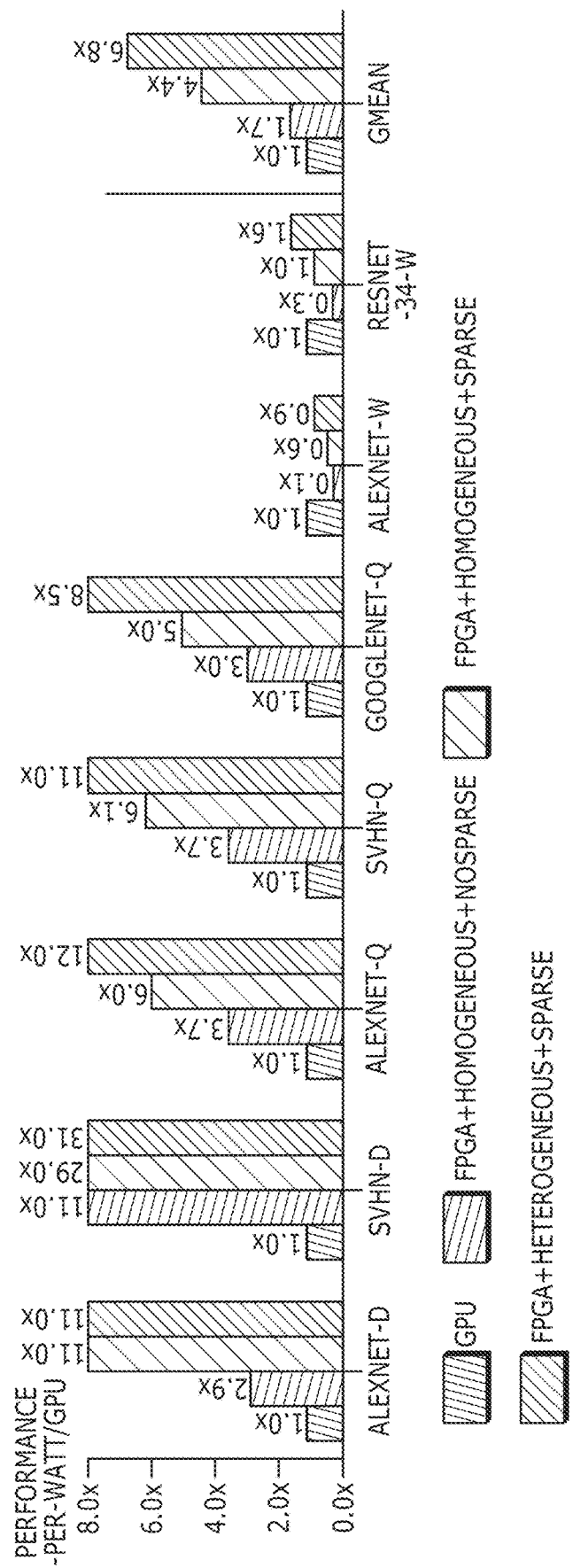

FIGS. 11 and 12 illustrate performance of the GPU platform in comparison to different variations of the present design as implemented in the FPGA platform.

The present design provides an alternative solution for GPUs, by leveraging the inherent characteristic of quantized deep learning and introducing heterogeneous accelerator architecture for FPGAs. As such, this design exists at the intersection of (a) quantization for deep learning, (b) acceleration for quantized deep learning, (c) acceleration for ML training, (d) heterogeneous architecture, and (e) exploitation of sparsity in deep learning.

Figure 13:
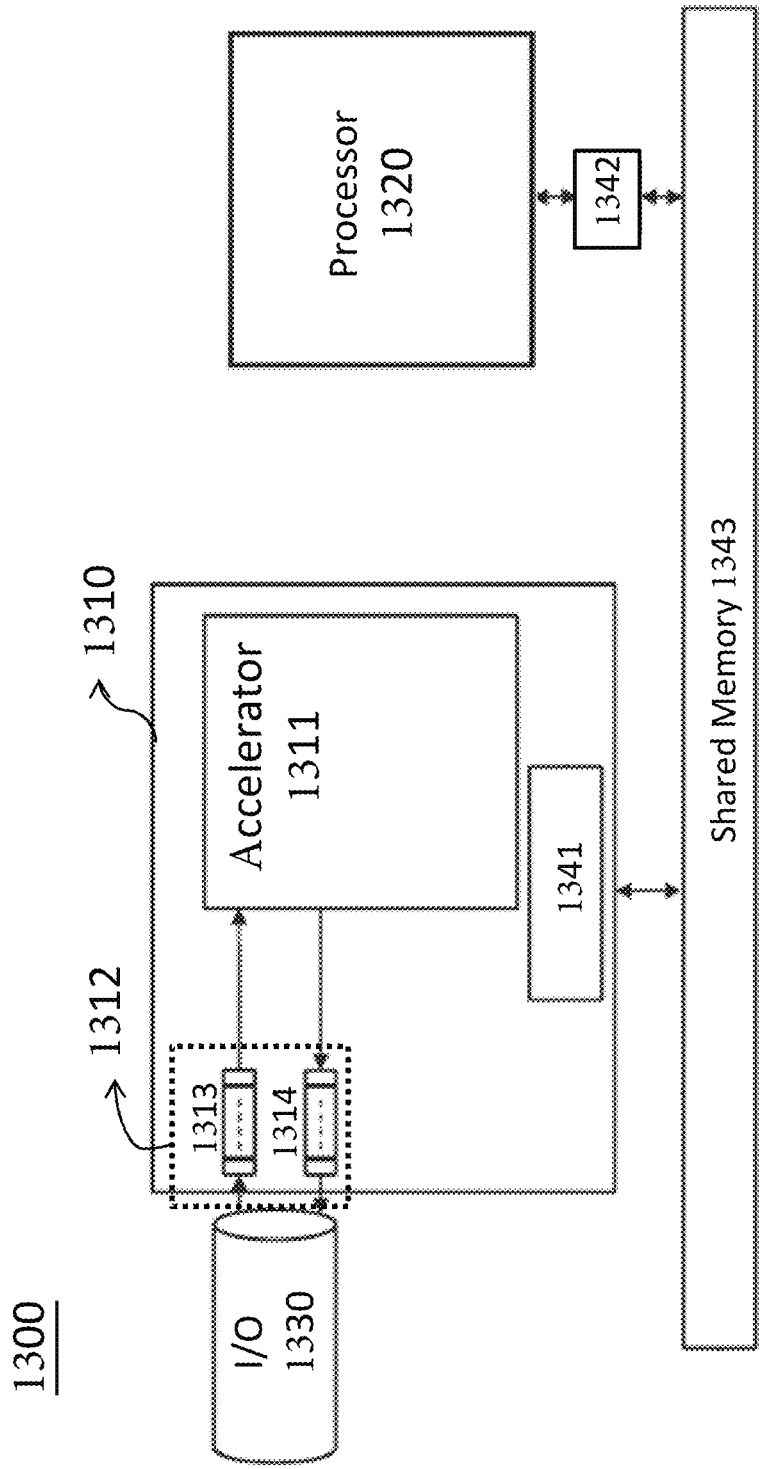
FIG. 13 illustrates the schematic diagram of a data processing system according to an embodiment of the present invention.

FIG. 13 illustrates the schematic diagram of data processing system 1300 according to an embodiment of the present invention. Data processing system 1300 includes I/O processing unit 1310 and general purpose instruction-based processor 1320. In an embodiment, general purpose instruction-based processor 1320 may include a general purpose core or multiple general purpose cores. A general purpose core is not tied to or integrated with any particular algorithm. In an alternative embodiment, general purpose instruction-based processor 1320 may be a specialized core. I/O processing unit 1310 may include an accelerator 1311 (e.g., in-line accelerator, offload accelerator for offloading processing from another computing resource, accelerator with heterogenous architecture for DNN training, etc.) for implementing embodiments as described herein. In-line accelerators are a special class of accelerators that may be used for I/O intensive applications. Accelerator 1311 and general purpose instruction-based processor may or may not be on a same chip. Accelerator 1311 is coupled to I/O interface 1312. Considering the type of input interface or input data, in one embodiment, the accelerator 1311 may receive any type of network packets from a network 1330 and an input network interface card (NIC). In another embodiment, the accelerator maybe receiving raw images or videos from the input cameras. In an embodiment, accelerator 1311 may also receive voice data from an input voice sensor device.

In an embodiment, accelerator 1311 partially performs the computation associated with the input data elements and transfers the control to other accelerators or the main general purpose instruction-based processor in the system to complete the processing. The term "computation" as used herein may refer to any computer task processing including, but not limited to, any of arithmetic/logic operations, memory operations, I/O operations, and offloading part of the computation to other elements of the system such as general purpose instruction-based processors and accelerators. Accelerator 1311 may transfer the control to general purpose instruction-based processor 1320 to complete the computation.

In an embodiment, accelerator 1311 may be implemented using any device known to be used as accelerator, including but not limited to field-programmable gate array (FPGA), Coarse-Grained Reconfigurable Architecture (CGRA), general-purpose computing on graphics processing unit (GPGPU), many light-weight cores (MLWC), network general purpose instruction-based processor, I/O general purpose instruction-based processor, and application-specific integrated circuit (ASIC). In an embodiment, I/O interface 1312 may provide connectivity to other interfaces that may be used in networks, storages, cameras, or other user interface devices. I/O interface 1312 may include receive first in first out (FIFO) storage 1313 and transmit FIFO storage 1314. FIFO storages 1313 and 1314 may be implemented using SRAM, flip-flops, latches or any other suitable form of storage. The input packets are fed to the accelerator through receive FIFO storage 1313 and the generated packets are sent over the network by the accelerator and/or general purpose instruction-based processor through transmit FIFO storage 1314.

In an embodiment, I/O processing unit 1310 may be Network Interface Card (NIC). In an embodiment of the invention, accelerator 1311 is part of the NIC. In an embodiment, the NIC is on the same chip as general purpose instruction-based processor 1320. In an alternative embodiment, the NIC 1310 is on a separate chip coupled to general purpose instruction-based processor 1320. In an embodiment, the NIC-based accelerator receives an incoming packet, as input data elements through I/O interface 1312, processes the packet and generates the response packet(s) without involving general purpose instruction-based processor 1320. Only when accelerator 1311 cannot handle the input packet by itself, the packet is transferred to general purpose instruction-based processor 1320. In an embodiment, accelerator 1311 communicates with other I/O interfaces, for example, storage elements through direct memory access (DMA) to retrieve data without involving general purpose instruction-based processor 1320.

Accelerator 1311 and the general purpose instruction-based processor 1320 are coupled to shared memory 1343 through private cache memories 1341 and 1342 respectively. In an embodiment, shared memory 1343 is a coherent memory system. The coherent memory system may be implemented as shared cache. In an embodiment, the coherent memory system is implemented using multiples caches with coherency protocol in front of a higher capacity memory such as a DRAM.

In an embodiment, the transfer of data between different layers of accelerations may be done through dedicated channels directly between accelerator 1311 and processor 1320. In an embodiment, when the execution exits the last acceleration layer by accelerator 1311, the control will be transferred to the general-purpose core 1320.

Processing data by forming two paths of computations on accelerators and general purpose instruction-based processors (or multiple paths of computation when there are multiple acceleration layers) have many other applications apart from low-level network applications. For example, most emerging big-data applications in data centers have been moving toward scale-out architectures, a technology for scaling the processing power, memory capacity and bandwidth, as well as persistent storage capacity and bandwidth. These scale-out architectures are highly network-intensive. Therefore, they can benefit from acceleration. These applications, however, have a dynamic nature requiring frequent changes and modifications. Therefore, it is highly beneficial to automate the process of splitting an application into a fast-path that can be executed by an accelerator with subgraph templates and a slow-path that can be executed by a general purpose instruction-based processor as disclosed herein.

While embodiments of the invention are shown as two accelerated and general-purpose layers throughout this document, it is appreciated by one skilled in the art that the invention can be implemented to include multiple layers of computation with different levels of acceleration and generality. For example, a FPGA accelerator can backed by a many-core hardware. In an embodiment, the many-core hardware can be backed by a general purpose instruction-based processor.

Figure 14:
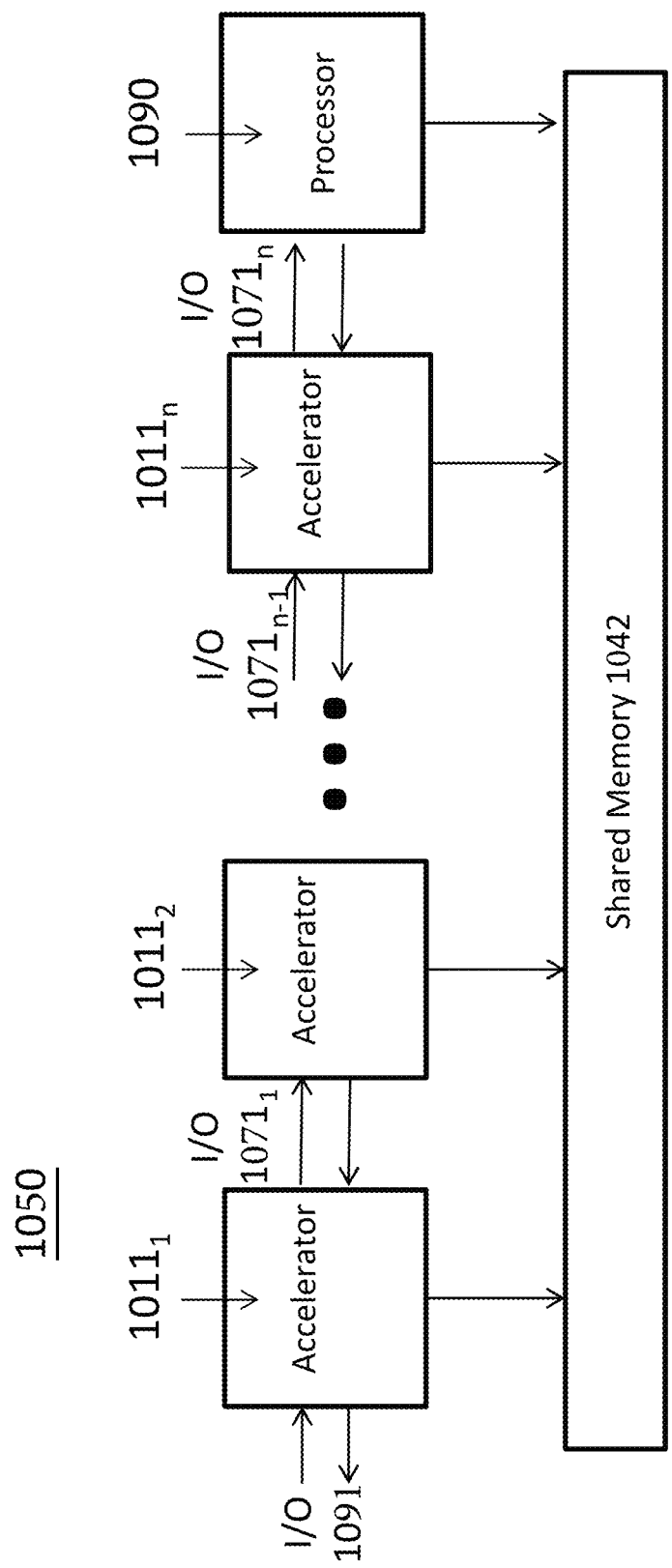
FIG. 14 illustrates the schematic diagram of a multi-layer accelerator according to an embodiment of the invention.

Referring to FIG. 14, in an embodiment of invention, a multi-layer system 1000 is formed by a first accelerator 1011₁ (e.g., in-line accelerator, offload accelerator for offloading processing from another computing resource, accelerator with heterogenous architecture for DNN training, or both) and several other accelerators 1011ₙ (e.g., in-line accelerator, offload accelerator for offloading processing from another computing resource, accelerator with heterogenous architecture for DNN training, or both). The multi-layer system 1050 includes several accelerators, each performing a particular level of acceleration. In such a system, execution may begin at a first layer by the first accelerator 1011₁. Then, each subsequent layer of acceleration is invoked when the execution exits the layer before it. For example, if the accelerator 1011₁ cannot finish the processing of the input data, the input data and the execution will be transferred to the next acceleration layer, accelerator 1011₂. In an embodiment, the transfer of data between different layers of accelerations may be done through dedicated channels between layers (e.g., 1071₁ to 1071ₙ). In an embodiment, when the execution exits the last acceleration layer by accelerator 1011ₙ, the control will be transferred to the general-purpose core 1090.

Figure 15:
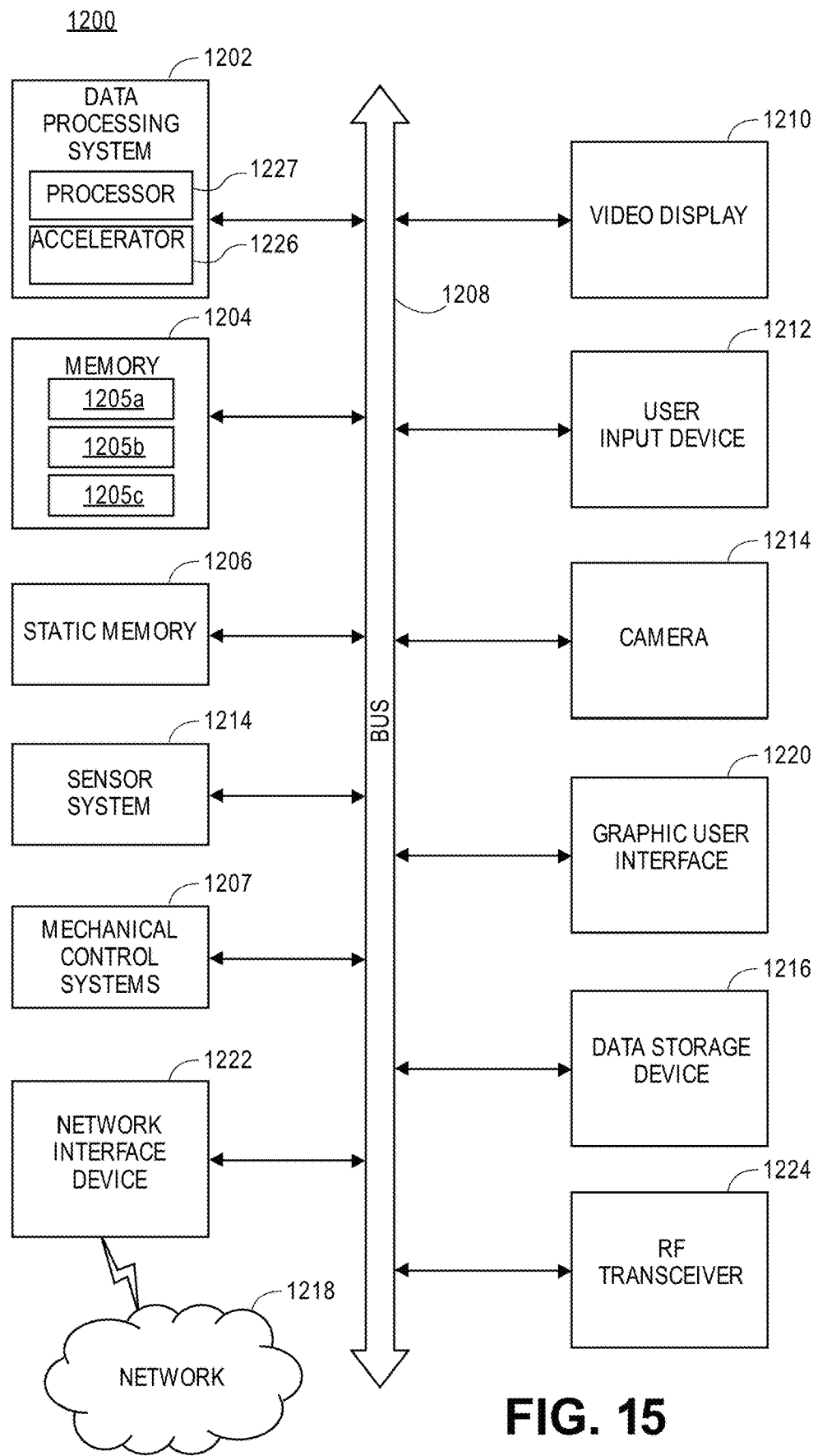
FIG. 15 is a diagram of a computer system including a data processing system according to an embodiment of the invention.

FIG. 15 is a diagram of a computer system including a data processing system that utilizes an accelerator according to an embodiment of the invention. Within the computer system 1200 is a set of instructions for causing the machine to perform any one or more of the methodologies discussed herein including accelerating machine learning operations. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1202, as disclosed above, includes a general purpose instruction-based processor 1227 and an accelerator 1226 (e.g., in-line accelerator, offload accelerator for offloading processing from another computing resource, accelerator with heterogenous architecture for DNN training, etc.). The general purpose instruction-based processor may be one or more general purpose instruction-based processors or processing devices (e.g., microprocessor, central processing unit, or the like). More particularly, data processing system 1202 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like. Data processing system 1202 is configured to implement the data processing system for performing the operations and steps discussed herein.

The exemplary computer system 1200 includes a data processing system 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in computer system 1200 may be configured to implement the data storing mechanisms for performing the operations and steps discussed herein. Memory 1206 can store code and/or data for use by processor 1227 or accelerator 1226. Memory 1206 include a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 1227 and accelerator 1226 execute various software components stored in memory 1204 to perform various functions for system 1200. Furthermore, memory 1206 may store additional modules and data structures not described above.

Operating system 1205a includes various procedures, sets of instructions, software components and/or drivers for controlling and managing general system tasks and facilitates communication between various hardware and software components. A compiler is a computer program (or set of programs) that transform source code written in a programming language into another computer language (e.g., target language, object code). A communication module 1205c provides communication with other devices utilizing the network interface device 1222 or RF transceiver 1224.

The computer system 1200 may further include a network interface device 1222. In an alternative embodiment, the data processing system disclose is integrated into the network interface device 1222 as disclosed herein. The computer system 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse), a camera 1214, and a Graphic User Interface (GUI) device 1220 (e.g., a touch-screen with input & output functionality).

The computer system 1200 may further include a RF transceiver 1224 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 1204 and/or within the data processing system 1202 by the computer system 1200, the main memory 1204 and the data processing system 1202 also constituting machine-readable storage media.

In one example, the computer system 1200 is an autonomous vehicle that may be connected (e.g., networked) to other machines or other autonomous vehicles in a LAN, WAN, or any network. The autonomous vehicle can be a distributed system that includes many computers networked within the vehicle. The autonomous vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The autonomous vehicle can operate in the capacity of a server or a client in a client-server network environment, or as a peer machine in a peer-to-peer (or distributed) network environment. The storage units disclosed in computer system 1200 may be configured to implement data storing mechanisms for performing the operations of autonomous vehicles.

The computer system 1200 also includes sensor system 1214 and mechanical control systems 1207 (e.g., motors, driving wheel control, brake control, throttle control, etc.). The processing system 1202 executes software instructions to perform different features and functionality (e.g., driving decisions) and provide a graphical user interface 1220 for an occupant of the vehicle. The processing system 1202 performs the different features and functionality for autonomous operation of the vehicle based at least partially on receiving input from the sensor system 1214 that includes laser sensors, cameras, radar, GPS, and additional sensors. The processing system 1202 may be an electronic control unit for the vehicle.

This specification describes the methods, systems, apparatus, and circuits for an adaptive acceleration of neural networks by taking advantage of the reconfigurability offered by the circuit, including FPGAs-based circuits, ASICs, and even traditional architectures like CPUs/GPUs, to dynamically optimize the circuit for executing neural networks by sampling and observing the runtime characteristics of (1) number of redundant zero-valued multiplications and additions and (2) the precision for the operations, in the neural network.

Further, the present design can automatically optimize the distribution of on-chip resources including: (1) total on-chip power-budget; (2) on-chip compute resources, including the DSPs, LUTs, URAMs, BRAMs, etc. for FPGA-implementation.

The method presented in this specification can automatically optimize the, platform resources described above, allocated for different computations in Neural Network training and inference.

FIG. 16 describes the computations required for neural network training. As the figure shows, neural network training requires forward propagation operations that operate on inputs and weights, as shown in FIG. 16; and backward propagation operations that operate on inputs and gradients, as shown in FIG. 16, and weights and gradients, as shown in FIG. 16.

FIG. 16 describes the operations in the forward propagation 2700 and backward propagation 2750 phases for training neural networks. The forward propagation 2700 operations take one or more multidimensional arrays of inputs along with zero, one, or more multidimensional arrays of weights 2702, along with other intermediate data. In one example, the convolution operation ($Conv_f$ 2710) that takes a 4-dimensional array of inputs 2701, and a 4-dimensional array of weights 2702 to generate a 4-dimensional output 2703.

2750 describes the operations in the backward propagation for training neural networks associated with the $Conv_f$ 2710 operation in FIG. 16. The $Conv_w$ 2720 operation in FIG. 16 takes as input a 4-dimensional inputs and a 4-dimensional gradients 2751 to generate a 4-dimensional output 2753. Similarly, the $Conv_b$ 2721 operation in FIG. 16(3) takes as input 4-dimensional weights and 4-dimensional gradients 2751 to produce a 4-dimensional output 2752.

The $Conv_f$ 2710, $Conv_w$ 2720, and $Conv_b$ 2721 operations in FIG. 16 consist of a large number of multiplications and the results from the multiplications are accumulated. When one of the operands for the multiplication operation is zero, the operation has no effect on the final accumulated result, making the multiplication redundant. As such, the multiplications that have one operand as zero can be skipped to provide improved performance or energy efficiency.

Below, this specification first describes an exemplary architecture for execution the operations in Neural Network training and inference.

FIG. 17 shows one implementation of the template architecture for FPGA implementation, which is a specialized circuit for accelerating training of neural networks. In one implementation, the template architecture consists of two types of blocks: (1) a block called Q-array 2010, and (2) a block called MP-array 2020. Both the Q-array 2010 and MP-array 2020 blocks can perform all the operations required for neural network training and inference.

Below, this specification describes the common components between Q-array 2010 and MP-array 2020. Both Q-array 2010 and MP-array 2020 contain a plurality of Compute Units (CUs), as shown in FIG. 17. The CUs perform the multiply-add operations, and other operations required for neural network training, including the operations for $Conv_f$ 2710, $Conv_w$ 2720, and $Conv_b$ 2721.

In one implementation, the CUs 2100 in Q-array 2010 and the CUs 2400 in MP-array 2020 are organized as a systolic array. The Q-array 2010 is responsible for the forward propagation operations, including $Conv_f$ 2710. The MP-array 2020 is responsible for the backward propagation operations, including $Conv_w$ 2720 and $Conv_b$ 2721.

In one implementation, the CU (CUs 2100 and CUs 2400) consists of just (1) a multiply and add circuitry, and (2) a private on-chip storage buffer called WBUF, as shown in FIG. Each CU accepts data from the CU of the previous column (the CU on its left) and multiplies it with data from its private storage buffer (WBUF). Further, each CU adds the result from the multiplication with the result from the CU in the previous row (the CU above) and forwards the data to the CU for the next row (to the CU below). Thus, the results from multiplications in each CU are accumulated across rows.

Both the Q-array 2010 and MP-array 2020 have additional buffers to (1) store the data that is shared across different CUs (both CUs 2100 and CUs 2400), called IBUF (IBUF 2011 for Q-array 2010 and IBUF 2021 for MP-array 2020), and (2) store the accumulated results for each column of CUs, called OBUF (OBUF 2012 for Q-array 2010 and OBUF 2022 for MP-array 2020).

The difference between the two blocks, Q-array 2010 and MP-array 2020, is the precision of operands supported. The Q-array 2010 block supports the precision required by inputs 2701 and weights 2702, which is often lower than the precision required by gradients (2751, 2752, and 2753). The MP-array 2020 block supports both the high precision required by gradients (2751, 2752, and 2753) and the low precision required by inputs 2701 and weights 2702.

Another difference between the Q-array 2010 and MP-array 2020 is that the MP-array 2020 can skip redundant zero-valued multiplications for gradients (2751, 2752, and 2753), while Q-array 2010 cannot do zero-skipping.

Both the Q-array 2010 and MP-array 2020 in the template architecture are flexible and have associated tunable parameters that can be optimized dynamically based on the characteristics on the neural network. In one implementation, the parameters are: (1) The precision of the multidimensional arrays in the neural network; (2) the storage capacity for the multidimensional arrays of inputs, weights, and gradients; and (3) the number of compute units in the circuit to execute operations in the neural network.

Tunable parameters of exemplary template architecture include: (1) number of CUs in Q-array 2010 and MP-array 2020 can be varied independently; (2) number of entries that can be stored in the IBUF (IBUF 2011 and IBUF 2021), OBUF (OBUF 2012 and OBUF 2022), and WBUF that is private to CU 2100 and CU 2400, can be varied independently in both Q-array 2010 and MP-array 2020; (3) the size of the words stored in each IBUF, OBUF, and WBUF can be varied independently in both Q-array 2010 and MP-array 2020 and depends on the precision of the operands; and (4) the size of the words stored in each IBUF, OBUF, and WBUF can be varied independently in both Q-array 2010 and MP-array 2020 and depends on the precision of the operands; and (5) voltage and frequency for the different components of the circuit.

This specification describes a method for automatically and dynamically optimizing the parameters for the circuit for accelerating Neural Network training and inference by observing the runtime characteristics of the data and operations in the Neural Network, to provide one or more of the following advantages: (1) better performance, (2) reduction in energy consumption, (3) reduction in resource utilization.

The runtime characteristics for Neural Network acceleration to be observed is the number of zeros in the inputs 2701, gradients (2752, 2753, and 2751), weights 2702, or other intermediate data in the execution of the Neural Network training or inference. The algorithmic characteristics of the number of zero-valued data can vary significantly during the course of training for the neural networks. As such, the method presented in this specification can dynamically adapt to the needs of the neural network during training.

In one embodiment, the method described in this specification can be used for automatically and dynamically optimizing the allocation resources, including LUTs, LUTRAMS, BRAMs, DSPs, FFs, and URAMs, based on the characteristics of the neural network for FPGA implementation for the exemplary architecture presented in FIG. 17. For FPGA-based acceleration, the allocation of compute resources to the two components (Q-array 2010 and MP-array 2020) in the template architecture is flexible, and can be optimized during the execution of the neural network.

In another embodiment, the method described in this specification can be used for automatically and dynamically optimizing the on-chip power allocation for the different components ((Q-array 2010 and MP-array 2020) in ASIC implementation through mechanisms including dynamic voltage and frequency scaling.

In another embodiment, the method described in this specification can be used for automatically and dynamically optimizing the thread allocation for the cores in traditional CPU/GPU architectures.

An innovative aspect of this specification is that the precision of the multidimensional arrays of data in the neural network can be adjusted between different training iterations to provide better performance by reducing the precision, since reducing the precision enables more compute units (CU) to (1) fit within the same resource budget or within the same power budget, (2) provide the same performance for lower power consumption, or (3) to increase the precision, if needed, for better quality results.

In one example, the proposed template architecture and the proposed optimization algorithm can enable the use of low precision in the earlier iterations of training and enable high precision in the later iterations of training. Using low precision in the earlier iterations of training will enable the neural network the template architecture to quickly perform the initial iterations of training. For the later iterations of training, the precision can be increased to achieve higher accuracy.

Below, this specification presents an automated algorithm that monitors the number of zero-valued multiplications and precision requirements for the multidimensional arrays of data in the neural network at runtime and accordingly adapts the circuit parameters and the precision for various data and operations for neural network training and inference.

As shown in FIG. 18, the method described in this specification for automatically optimizing the resource allocation for the template architecture consists of five steps: (1) dataflow specification, (2) dataflow analysis, (3) resource partitioning, (4) scheduling and estimation, and (5) builder.

The workflow 3100 begins with the programmer defining the DataFlow Graph (DFG) of the neural network in step 3110.

In another embodiment of this specification, the precision, the precision can be optimized and adjusted automatically during the training iterations for the neural network.

In one embodiment of this specification, the precision of the multidimensional arrays associated with the edges of the DFG can be specified in this step and remains fixed throughout the training iterations.

Once the DFG of the neural network has been specified in step 3110, the next step is dataflow analysis 3111, which determines the resources required by the template architecture to execute the neural network DFG. The analysis is divided into two parts, specified as follows:

The first part 3120 of the DFG analysis 3111 is to analyze the number and type of computations by the Neural Network. To this end, the dataflow analyzer component iterates over the nodes of the dataflow graph of the Neural Network and generates a list of (operation type, precision, operation count) pairs for the forward propagation and backward propagation phases of training.

The operation type is the type of scalar operation (multiply, add, etc), the precision field is a tuple of the data-types required by the operands (fixed-point, floating-point, or power-of-2), the operation count field describes the number of scalar operations. Next, the dataflow analyzer 3111 generates the highest and lowest precision required for the forward pass and repeats the same for the backward pass. Determining the precision requirements is essential for estimating the resources (LUTs, DSPs, and Flip-Flops, power-consumption, etc.) required for CUs in the template architecture.

While static analysis in step 3120 determines the static utilization of the FPGA's resources, runtime analysis 3121 is essential to estimate the dynamic utilization considering that a large number of multiply-add operations in a DNN are ineffectual due to one of the operands being zero. To this end, the dataflow analyzer performs runtime analysis by observing and sampling the data propagated in the forward and backward passes of the dataflow graph for one or more iteration using a user-specified batch-size of inputs. Next, the dataflow analyzer 3111 calculates the proportion of zero-valued data in sampled data.

In one implementation, the runtime analysis step 3121 can calculate the precision required by the multidimensional arrays of inputs, weights, gradients, and other intermediate data for the Neural Network. The metrics for calculating the precision required by multidimensional arrays includes calculating the upper and lower bound of the data in multidimensional arrays to calculate the minimum number of bits required for representing the data in that array.

Using the information generated by the static and runtime analysis in the dataflow analysis step, the resource partitioning step 3112 divides the platforms resources as follows.

In one example, the resource step 3112 of the workflow 3100 uses an analytical model. In an alternative example, iterative methods such as reinforcement learning, may be employed instead using an analytical model. In both examples, the analytical model or the iterative methods are used to optimize either the breakdown of platform resources 3140.

To simplify the analysis, in one embodiment of this specification, the resource partitioner 3112 may only consider the MAC operations for the analytical model, since most operations in a DNN are Multiply-Accumulate (MAC) operations. In another embodiment of this specification, the resource partitioner 3112 can consider other types of operations as well when the number of MAC operations is not the most common operation.

Below, this specification describes a novel method for analytically calculating the optimal breakdown of the platform resources 3140 for the exemplary architecture presented in 2000.

For a given pair of ($precision_{fwd}$, $ops_{fwd}$) and ($precision_{bwd}$, $ops_{bwd}$) for the forward and backward passes of training, the resource partitioner generates the optimal breakdown (p, 1−p) of FPGA's resources for executing forward and backward passes, respectively.

$$alu_{fwd} = \frac{p \times resource_{fwd}}{resource_{total}} \qquad (1a)$$

$$alu_{bwd} = \frac{(1-p) \times resource_{bwd}}{resource_{total}} \qquad (1b)$$

Where $resource_{fwd}$ and $resource_{bwd}$ are obtained from synthesizing compute units with $precision_{fwd}$ and $precision_{bwd}$, respectively. Next, the resource partitioning component optimizes the ideal number of cycles required by the forward and backward operations given by the following equation:

$$cycles_{total} = \frac{ops_{fwd} \times nz_{fwd}}{alu_{fwd} + alu_{bwd}} + \frac{ops_{bwd} \times nz_{fwd}}{alu_{bwd}} \qquad (2)$$

Using equations [1b] and [1b], equation [2] solved quadratically to get the optimal partitioning p as follows.

$$\text{minimize cycles}_{total}(p),\ p \in [0, 1) \quad (3)$$

$$p = -\frac{c}{c \times r - 1} + \sqrt{\frac{(c+1)^2}{(c \times r - 1)^2} - \frac{c-r}{r \times (c \times r - 1)}}, \quad (4)$$

where $$c = \frac{ops_{bwd} \times nz_{bwd}}{ops_{fwd} \times nz_{fwd}} \quad (5)$$

$$r = \frac{resource_{bwd}}{resource_{fwd}} - 1 \quad (6)$$

Here, the c term in Equation 5 is the ratio of non-zero computations in the backward pass to the non-zero computations in the forward pass, and r term in Equation 6 is the one minus the ratio of resources required for the backward pass to the resources required by the forward pass. While computing the value of r requires static information, computing requires c require both static and dynamic information.

The value of p obtained from equation [4] is the optimal breakdown of the FPGA's resources for one implementation of the exemplary circuit presented in FIG. 17. However, even quantized Neural Networks can have a large memory footprint and hence performance of the circuit 2000 generated by workflow depends both on the breakdown of the FPGA's resources and the organization of on-chip memory. Nevertheless, the value of p obtained from equation [4] serves as an initial solution for optimizing the breakdown of the platform's resources 3140.

Below, we discuss the scheduler step 3113 of workflow 3100 which evaluates the resource breakdown (p from Equation [4]) provided by the resource partitioner 3112.

In one implementation, the scheduler step 3113 evaluates the quality of the solution generated by the resource partitioner by either (1) using a cycle-accurate simulation model for determining the quality of the partitioning solution; or (2) observing the performance of the partitioning solution using performance counters when a simulation model is not available.

In one implementation, the scheduler step 3113 component divides the platform resources 3140 between Q-array 2010 and MP-array 2020. Next, the simulator evenly divides the FPGA's resources including DSP, LUT, URAM, and BRAM for each instance of Q-array 2010 and MP-array 2020.

Finally, using the number of forward and backward systolic arrays along with the memory organization, the scheduler step 3113 performs cycle-accurate simulation. The simulation model in scheduler step 3113 can account for other bottlenecks for the circuit 2000, including limited bandwidth and latency for communication over both PCIe and the off-chip DRAMs.

The scheduler generates the cycle counts for Q-array 2010 and MP-array 2020. Using the cycle-counts, the scheduler updates the compute ratio c defined in Equation [5] as follows.

$$c_{next} = \frac{cycles_{Q\text{-}array\ 2010}}{cycles_{MP\text{-}array\ 2020}} \quad (7)$$

The scheduler then feeds back the updated compute ratio to the resource partitioner step 3112. FIG. 19 summarizes the tasks of the Dataflow Analyzer 3111, Resource Partitioner 3112, and Scheduler 3113.

Since the method described in this specification aims to flexibly support a wide range of quantized training algorithms, it uses a template architecture to accelerate a wide range of quantized Neural Networks. The first three components (3111, 3112, and 3113) generate an optimized set of parameters for the template architecture along with an optimized execution schedule.

The last component, the builder 3114 generates a synthesizable accelerator in case of FPGA implementation, along with the optimized values of circuit parameters using both the optimized set of architectural parameter and execution schedule.

Further, the builder 3114 compiles and generates the instruction binary 3152, which is the computer program that can execute using the template architecture. Generating the instruction binary 3152 enables the present method to optimize the software that gets executed on the circuit 2000.

Finally, the builder 3114 generates circuit parameters 3151, which include the voltage and frequency for different compute and storage components in the circuit 2000. The circuit parameters 3151 enable the optimization of total on-chip power budget for both for FPGA implementations and ASIC implementation without changing the circuit itself.

The output from the builder 3114 can then be used to iteratively optimize the execution of Neural Network training and inference. As such, the output 3150 is fed back to the dfg analysis step 3111 for the next plurality of iterations of Neural Network training and inference. The dfg analysis step 3111 then repeats the process of observing and sampling runtime characteristics of the Neural Network during the execution of training iterations.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. A data processing system to perform a workflow for generating a hardware accelerator, comprising:
   memory; and
   a processor coupled to the memory, the processor is configured to perform a dataflow analysis operation to analyze resource requirements for a dataflow graph of a neural network (NN) model, to perform a resource partitioning operation to analytically split resources of a hardware accelerator, to perform a cycle-accurate scheduling operation to obtain cycle counts for forward and backward passes of the dataflow graph, and to generate a synthesizable hardware accelerator using an optimal resource breakdown.

2. The data processing system of claim 1, wherein the hardware accelerator is implemented on a Field Programmable Gate Array (FPGA).

3. The data processing system of claim 1, wherein performing a dataflow analysis operation to analyze resource requirements for a dataflow graph of the NN model includes iterating, with a dataflow analyzer component, over nodes of the dataflow graph of the NN model and generating a list of pairs including operation type, precision, and operation count for the forward and backward passes of training.

4. The data processing system of claim 1, wherein the processor is further configured to generate a highest precision and a lowest precision for the forward pass of training and to generate, during static analysis, a highest precision and a lowest precision for the backward pass of training.

5. The data processing system of claim 1, wherein the processor is further configured to perform runtime analysis by sampling data propagated in the forward and backward passes of the dataflow graph for numerous iterations using a user-specified batch-size of inputs and to calculate the proportion of zero-valued data in sampled data.

6. The data processing system of claim 1, wherein performing a cycle-accurate scheduling operation to obtain cycle counts for forward and backward passes of the dataflow graph includes dividing the data processing systems look up table and digital signal processing (DSP) resources into systolic arrays for the forward and backward passes using the optimal resource breakdown, utilizing a two level hierarchy for organizing on-chip memory, and performing cycle-accurate simulation.

7. The data processing system of claim 1, further comprising:
a general purpose array that is configured to compute element-wise data transformations for quantized training.

8. The data processing system of claim 1, wherein the hardware accelerator includes a quantized component for inputs and weights, a mixed precision component for gradients and inputs, and a mixed precision component for gradients and weights.

9. A computer implemented method for quantized neural network (DNN) training comprising:
performing a dataflow analysis operation to analyze resource requirements for a dataflow graph of a DNN model;

performing, with an analytical model, a resource partitioning operation to analytically split resources of a hardware accelerator;

performing a cycle-accurate scheduling operation to obtain cycle counts for forward and backward passes of the dataflow graph; and generating a synthesizable hardware accelerator using an optimal resource breakdown.

10. The computer implemented method of claim 9, wherein performing a dataflow analysis operation to analyze resource requirements for a dataflow graph of a DNN model includes iterating, with a dataflow analyzer component, over nodes of the dataflow graph of the DNN model and generating a list of pairs including operation type, precision, and operation count for the forward and backward passes of training.

11. The computer implemented method of claim 9, further comprising:
generating, during static analysis with the dataflow analyzer, a highest precision and a lowest precision for the forward pass of training; and generating, during static analysis with the dataflow analyzer, a highest precision and a lowest precision for the backward pass of training.

12. The computer implemented method of claim 11, further comprising:
performing runtime analysis by sampling data propagated in the forward and backward passes of the dataflow graph for numerous iterations using a user-specified batch-size of inputs; and calculating the proportion of zero-valued data in sampled data.

13. The computer implemented method of claim 12, wherein performing a cycle-accurate scheduling operation to obtain cycle counts for forward and backward passes of the dataflow graph includes dividing the hardware accelerators look up table and digital signal processing (DSP) resources into systolic arrays for the forward and backward passes using the optimal resource breakdown, utilizes a two level hierarchy for organizing on-chip memory, and perform cycle-accurate simulation.

* * * * *